(12) United States Patent
Zhu et al.

(10) Patent No.: US 12,556,366 B2
(45) Date of Patent: Feb. 17, 2026

(54) PRIVACY-PRESERVING COMPUTATION METHOD AND SYSTEM FOR SECURE THREE-PARTY LINEAR REGRESSION

(71) Applicant: Beihang University, Beijing (CN)

(72) Inventors: Haogang Zhu, Beijing (CN); Shizhao Peng, Beijing (CN); Derun Zhao, Beijing (CN)

(73) Assignee: Beihang University, Beijing (CN)

(*) Notice: Subject to any disclaimer, the term of this patent is extended or adjusted under 35 U.S.C. 154(b) by 69 days.

(21) Appl. No.: 18/584,030

(22) Filed: Feb. 22, 2024

(65) Prior Publication Data
US 2025/0106004 A1    Mar. 27, 2025

(30) Foreign Application Priority Data

Sep. 21, 2023    (CN) .................. 202311227154.X

(51) Int. Cl.
*H04L 9/06*          (2006.01)
*G06F 17/16*        (2006.01)

(52) U.S. Cl.
CPC ............ *H04L 9/0625* (2013.01); *G06F 17/16* (2013.01); *H04L 2209/16* (2013.01)

(58) Field of Classification Search
CPC ..... G06F 17/18; G06F 17/16; H04L 2209/46; H04L 9/0625; H04L 2209/16
See application file for complete search history.

(56) References Cited

U.S. PATENT DOCUMENTS

2022/0237319 A1*    7/2022  Liu ................ G06F 21/6254

OTHER PUBLICATIONS

Wenliang Du and Zhijun Zhan, "A practical approach to solve Secure Multi-party Computation problems" In Proceedings of the 2002 workshop on New security paradigms (NSPW '02). Association for Computing Machinery, New York, NY, USA, 127-135. (2002) https://doi.org/10.1145/844102.844125.*

Du, Wenliang; Han, Yunghsiang S.; and Chen, Shigang, "Privacy-Preserving Multivariate Statistical Analysis: Linear Regression and Classification" (2004). Electrical Engineering and Computer Science—All Scholarship. https://surface.syr.edu/eecs/12.*

(Continued)

*Primary Examiner* — Jung W Kim
(74) *Attorney, Agent, or Firm* — WELSH FLAXMAN & GITLER LLC

(57) ABSTRACT

Disclosed is a privacy-preserving computation method and system for secure three-party linear regression, relating to the technical field of privacy-preserving computation. The method includes: processing, by two participants, two private transposed matrices and two private matrices by using a 2PHMP to obtain $\partial_1$ and $\partial_2$; processing, by the two participants, $\partial_1$ and $\partial_2$ by using a 2PIP to obtain $u_1$ and $u_2$; splitting, by the first participant, a first private transposed matrix into $v_1$ and $\Delta$; obfuscating and overlaying, by the second participant, a second private transposed matrix with $\Delta$ to obtain $v_2$; and processing $v_2$, $u_1$, $u_2$, $v_1$, and a third private matrix by using a 3PHMP to obtain a regression coefficient matrix.

8 Claims, 7 Drawing Sheets

(56) References Cited

OTHER PUBLICATIONS

Shizhao Peng and Tianrui Liu and Tianle Tao and Derun Zhao and Hao Sheng and Haogang Zhu, "EVA-S3PC: Efficient, Verifiable, Accurate Secure Matrix Multiplication Protocol Assembly and Its Application in Regression" (2024). https://arxiv.org/abs/2411.03404.*

F. van Daalen, L. Ippel, A. Dekker and I. Bermejo, "Privacy Preserving n-Party Scalar Product Protocol," in IEEE Transactions on Parallel and Distributed Systems, vol. 34, No. 4, pp. 1060-1066, Apr. 1, 2023, doi: 10.1109/TPDS.2023.3238768.*

* cited by examiner (a)

(b)

$$\begin{bmatrix} M \end{bmatrix} \cdot \beta = \begin{bmatrix} Y \end{bmatrix}$$

(a)

FIG. 3A $$\begin{bmatrix} M_1 \\ \hline M_2 \end{bmatrix} \cdot \beta = \begin{bmatrix} Y_1 \\ \hline Y_2 \end{bmatrix}$$

(b)

FIG. 3B $$\begin{bmatrix} M_1 & | & M_2 \end{bmatrix} \cdot \beta = \begin{bmatrix} Y_1 & | & Y_2 \end{bmatrix}$$

(c)

FIG. 3C $$\begin{bmatrix} M_1 + M_2 \end{bmatrix} \cdot \beta = \begin{bmatrix} Y_1 + Y_2 \end{bmatrix}$$

PRIVACY-PRESERVING COMPUTATION METHOD AND SYSTEM FOR SECURE THREE-PARTY LINEAR REGRESSION

CROSS REFERENCE TO RELATED APPLICATION

This patent application claims the benefit and priority of Chinese Patent Application No. 202311227154X, filed with the China National Intellectual Property Administration on Sep. 21, 2023, the disclosure of which is incorporated by reference herein in its entirety as part of the present application.

TECHNICAL FIELD

The present disclosure relates to the technical field of privacy-preserving computation, and in particular, to a privacy-preserving computation method and system for secure three-party linear regression.

BACKGROUND

A privacy-preserving computation technology not only realizes secure circulation of data but also effectively ensures separation of data ownership and data use right on the premise that original data privacy is effectively guaranteed not to be disclosed. When privacy-preserving computation is applied to the field of data governance for multi-party joint regression modeling, the barriers between user privacy security and joint modeling performance will be completely bridged. The research on joint linear regression modeling based on privacy preserving holds certain theoretical and practical significance.

Currently, there are four main types of privacy-preserving computing solutions for linear regression problems: differential privacy, homomorphic encryption, secure multi-party computation, and federated learning.

Differential Privacy:

Kamalika C and others proposed a differential privacy protection algorithm for regression analysis, which is called DiffPETs. It enhances the security of differential privacy by adding noise to an objective function of an optimization problem. Pan and others introduced an adaptive differentially private regression (ADPR) model that dynamically allocates privacy budgets using a strongly correlated noise mechanism. This effectively reduces the noise in the objective function when input features have a significant impact on the model. However, while differential privacy-based solutions can achieve privacy protection by introducing noise to data or the objective function, the introduction of a large amount of noise can lead to a decrease in model accuracy and reduced usability. Therefore, the differential privacy technology is unreliable and imprecise.

Homomorphic Encryption:

Miran and others designed an optimized homomorphic encryption scheme for real number computations, using packing and parallelization techniques. It implements regression training on ciphertext data using gradient descent and approximates the logistic function through least squares to improve model accuracy and computational efficiency. Giacomelli and others proposed a system that trains a ridge linear regression model using only LHE. A cryptographic service provider (CSP) is responsible for initializing encryption parameters in the system, while a machine learning engine (MLE) is responsible for collecting encrypted datasets provided by data owners DOi and collaborating with the cryptographic service provider (CSP) to train the model. Dong and others introduced a locally weighted linear regression (LWLR) privacy-preserving computation system, which expands the exponential function in the Paillier encryption using the Taylor series and encrypts data using uses Paillier homomorphic encryption, and then performs LWLR computations on ciphertext data using a stochastic gradient descent algorithm. While homomorphic encryption-based solutions significantly enhance the privacy security of data by introducing ciphertext computations, the complexity of ciphertext models directly leads to an exponential increase in computational overhead. Additionally, in the case of large-scale data, an excessively high frequency of encryption operations can lead to a geometric increase in ciphertext noise, resulting in significant errors in computation results, making it impossible to recover plaintext through decryption. Therefore, the homomorphic encryption technology faces issues of low speed and low accuracy.

Secure Multi-Party Computation:

Mohassel and others designed a random gradient descent algorithm for secure two-party computation based on Garbled Circuits (GC) and Oblivious Transfer (OT) protocols. This approach implements a model training solution called SecureML for linear regression, logistic regression, and neural networks. In this approach, a data owner distributes private data to two servers using secret sharing, and the two servers train the model through secure multi-party computation, achieving distributed regression computation. Demmler and others proposed a privacy-preserving linear regression framework called ABY3, which is based on the secret sharing technology and the stochastic gradient descent (SGD) method. This framework generates multiplication triples by using three technical means: arithmetic sharing, Boolean sharing, and Yao circuits of an honest-but-curious environment, presenting a regression protocol based on efficient circuit transformation. Wei and others achieved fast training and modeling on vertically partitioned datasets through Asynchronous Gradient Sharing (AGS) and local multi-round computations in the presence of two parties. Although the secure multi-party computation scheme ensures both input privacy and computational accuracy, protocols of this type offset expensive computational overhead through extensive communication interactions. Consequently, an excessive increase in the number of participants leads to a significant increase in communication time. Therefore, the secure multi-party computation technology has the issue of long communication time.

Federated Learning:

Shokri and others proposed a privacy-preserving regression scheme based on federated learning by selectively sharing model gradients between servers and data owners. All computations are performed in a plaintext format. Bonawitz and others introduced a practical and secure federated learning model using secret sharing and key agreement protocols. This solution is implemented through secret sharing of gradients between non-colluding servers. While federated learning effectively prevents privacy leakage of local data of a data owner, the encryption of local data and interaction of gradient parameters increase local storage overhead and pose risks of model information leakage. Therefore, the federated learning technology fails to achieve dual protection for data and models.

In summary, there is a need for a privacy-preserving computation method that addresses the problems of the four types of privacy-preserving computation solutions mentioned above.

SUMMARY

An objective of the present disclosure is to provide a privacy-preserving computation method and system for secure three-party linear regression that can improve reliability and accuracy, reduce communication time, and achieve dual protection for data and models.

To achieve the above objective, the present disclosure provides the following technical solutions.

A privacy-preserving computation method for secure three-party linear regression is provided, including:

computing, by a first participant, a transposed matrix of a first private matrix to obtain a first private transposed matrix, where the first private matrix is a private matrix of the first participant;

computing, by a second participant, a transposed matrix of a second private matrix to obtain a second private transposed matrix, where the second private matrix is a private matrix of the second participant;

processing, by the first participant and the second participant, the first private transposed matrix, the second private transposed matrix, the first private matrix, and the second private matrix by using a secure two-party matrix hybrid multiplication protocol (2PHMP), to obtain a matrix $\partial_1$ and a matrix $\partial_2$, where the matrix $\partial_1$ is stored in the first participant, and the matrix $\partial_2$ is stored in the second participant;

processing, by the first participant and the second participant, the matrix $\partial_1$ and the matrix $\partial_2$ by using a secure two-party matrix inversion protocol (2PIP), to obtain a matrix $u_1$ and a matrix $u_2$, where the matrix $u_1$ is stored in the first participant, and the matrix $u_2$ is stored in the second participant;

splitting, by the first participant, the first private transposed matrix into a random matrix $v_1$ and a difference matrix $\Delta$, and sending the difference matrix $\Delta$ to the second participant;

secretly obfuscating and overlaying, by the second participant, the second private transposed matrix with the difference matrix $\Delta$ to obtain a private matrix $v_2$; and processing, by a requester of secure three-party linear regression computation, the first participant, the second participant, and a third participant, a first private matrix sequence, a second private matrix sequence, and a third private matrix by using a secure three-party matrix hybrid multiplication protocol (3PHMP), to obtain a regression coefficient matrix of a secure three-party linear regression model, where the third private matrix is a private matrix of the third participant, the first private matrix sequence includes the matrix $u_1$ and the random matrix $v_1$, and the second private matrix sequence includes the matrix $u_2$ and the random matrix $v_2$.

A privacy-preserving computation system for secure three-party linear regression is provided, including:

a first private transposed matrix computing module configured to allow a first participant to compute a transposed matrix of a first private matrix to obtain a first private transposed matrix, where the first private matrix is a private matrix of the first participant;

a second private transposed matrix computing module configured to allow a second participant to compute a transposed matrix of a second private matrix to obtain a second private transposed matrix, where the second private matrix is a private matrix of the second participant;

a 2PHMP module configured to allow the first participant and the second participant to process the first private transposed matrix, the second private transposed matrix, the first private matrix, and the second private matrix by using a secure two-party matrix hybrid multiplication protocol, to obtain a matrix $\partial_1$ and a matrix $\partial_2$, where the matrix $\partial_1$ is stored in the first participant, and the matrix $\partial_2$ is stored in the second participant;

a 2PIP module configured to allow the first participant and the second participant to process the matrix $\partial_1$ and the matrix $\partial_2$ by using a secure two-party matrix inversion protocol, to obtain a matrix $u_1$ and a matrix $u_2$, where the matrix $u_1$ is stored in the first participant, and the matrix $u_2$ is stored in the second participant;

a splitting module configured to allow the first participant to split the first private transposed matrix into a random matrix $v_1$ and a difference matrix $\Delta$, and send the difference matrix $\Delta$ to the second participant;

an obfuscation and overlay computation module configured to allow the second participant to secretly obfuscate and overlay the second private transposed matrix with the difference matrix $\Delta$ to obtain a private matrix $v_2$; and a 3PHMP module configured to allow a requester of secure three-party linear regression computation, the first participant, the second participant, and a third participant to process a first private matrix sequence, a second private matrix sequence, and a third private matrix by using a secure three-party matrix hybrid multiplication protocol, to obtain a regression coefficient matrix of a secure three-party linear regression model, where the third private matrix is a private matrix of the third participant, the first private matrix sequence includes the matrix $u_1$ and the random matrix $v_1$, and the second private matrix sequence includes the matrix $u_2$ and the random matrix $v_2$.

According to specific embodiments provided in the present disclosure, the present disclosure has the following technical effects:

The present disclosure solves the privacy-preserving computation problem of secure three-party linear regression using the secure two-party matrix hybrid multiplication protocol, secure two-party matrix inversion protocol, and secure three-party matrix hybrid multiplication protocol, to improve the speed and accuracy, and reduce the communication time. The three computation protocols include a secure two-party matrix multiplication protocol and secure three-party matrix multiplication protocol, enhancing the reliability. Moreover, the present disclosure achieves dual protection for data and models through data exchange among the participants, without relying on any external cloud servers or computing services.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

FIGS. 3A-D are schematic diagrams of four federated computing models based on a multi-source heterogeneous dataset according to an embodiment of the present disclosure;

DETAILED DESCRIPTION OF THE EMBODIMENTS

Figure 1:
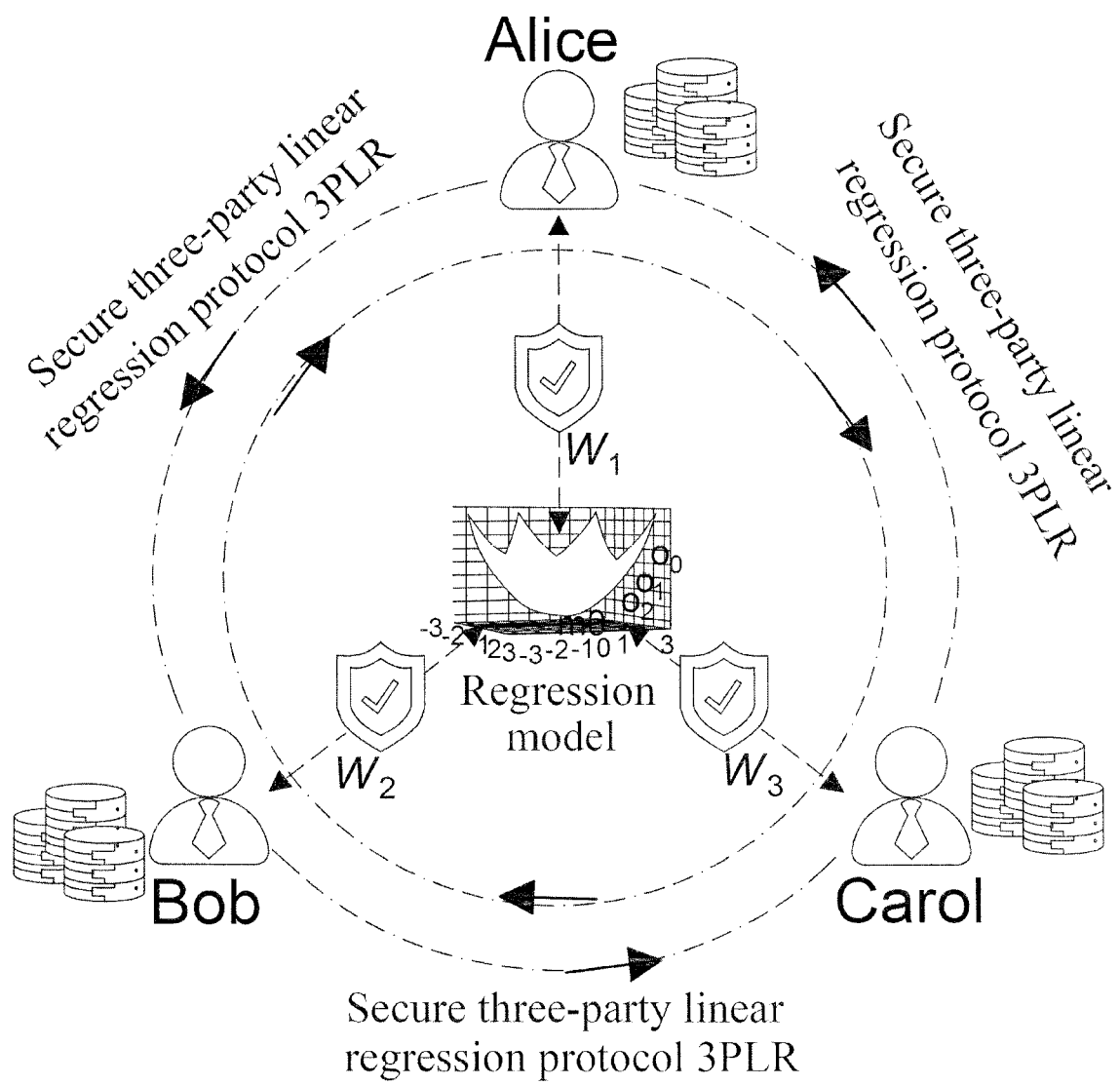
FIG. 1 is a schematic diagram of a secure three-party linear regression problem according to an embodiment of the present disclosure.

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

In order to make the above objective, features and advantages of the present disclosure clearer and more comprehensible, the present disclosure will be further described in detail below in combination with accompanying drawings and particular implementation modes.

The secure three-party linear regression protocol (3PLRP), as the name suggests, assumes the presence of three mutually distrusting participants: Alice, Bob, and Carol. A dataset $X=\{X_1|X_2\}$ is composed of a private data matrix $X_1$ and a private data matrix $X_2$, which are obtained by vertically partitioning and have the same number of samples. The participant Alice holds the private data matrix $X_1$, the participant Bob holds the private data matrix $X_2$, and the participant Carol holds a private data matrix $Y$ that contains label item information corresponding to the dataset. The three participants of the computation jointly execute a three-party regression model $f(X_1, X_2, Y)=\text{Output}(V_a', V_b', V_c')=\beta$. Eventually, the participants obtain respective output matrices $V_a'$, $V_b'$, $V_c'$, which are random splits of a model regression coefficient $\beta$. The outputs satisfy the regression coefficient $\beta=V_a'$, $V_b'$, $V_c=(X^TX)^{-1}X^TY$. Throughout the entire computation process, each participant node only has knowledge of the input and output data involved in its own computation flow and cannot access any intermediate computation results of other participant nodes. Privacy-preserving computation refers to a set of information technologies that allow for the analysis and computation of data while ensuring that the data provider does not disclose the original data, to ensure that data remains "available but invisible" during circulation and integration processes.

On this basis, an embodiment of the present disclosure provides a privacy-preserving computation method for secure three-party linear regression, which includes the following steps:

A first participant computes a transposed matrix of a first private matrix to obtain a first private transposed matrix, where the first private matrix is a private matrix of the first participant.

A second participant computes a transposed matrix of a second private matrix to obtain a second private transposed matrix, where the second private matrix is a private matrix of the second participant.

The first participant and the second participant process the first private transposed matrix, the second private transposed matrix, the first private matrix, and the second private matrix by using a secure two-party matrix hybrid multiplication protocol, to obtain a matrix $\partial_1$ and a matrix $\partial_2$, where the matrix $\partial_1$ is stored in the first participant, and the matrix $\partial_2$ is stored in the second participant.

The first participant and the second participant process the matrix $\partial_1$ and the matrix $\partial_2$ by using a secure two-party matrix inversion protocol, to obtain a matrix $u_1$ and a matrix $u_2$, where the matrix $u_1$ is stored in the first participant, and the matrix $u_2$ is stored in the second participant;

The first participant splits the first private transposed matrix into a random matrix $v_1$ and a difference matrix $\Delta$, and sends the difference matrix $\Delta$ to the second participant.

The second participant secretly obfuscates and overlays the second private transposed matrix with the difference matrix $\Delta$ to obtain a private matrix $v_2$.

A requester of the secure three-party linear regression computation, the first participant, the second participant, and a third participant processes a first private matrix sequence, a second private matrix sequence, and a third private matrix by using a secure three-party matrix hybrid multiplication protocol, to obtain a regression coefficient matrix of a secure three-party linear regression model, where the third private matrix is a private matrix of the third participant, the first private matrix sequence includes the matrix $u_1$ and the random matrix $v_1$, and the second private matrix sequence includes the matrix $u_2$ and the random matrix $v_2$.

The secure two-party matrix hybrid multiplication protocol (2PHMP), as the name suggests, assumes the presence of two mutually distrusting participants. The two participants hold secret input matrix pairs, $(X_1, X_1^T)$ and $(X_2, X_2^T)$, respectively, and jointly execute a two-party hybrid multiplication protocol $f((X_1, X_1^T), (X_2, X_2^T))=\text{Output}(\partial_1, \partial_2)=(X_1+X_2)\cdot(X_1^T+X_2^T)$. Eventually, the two participants obtain corresponding outputs $\partial_1$, $\partial_2$ respectively, and the outputs satisfy $\partial_1+\partial_2=(X_1+X_2^T)\cdot(X_2+X_2^T)$. Throughout the entire computation process, each participant node only has knowledge of the input and output data involved in its own computation process and cannot access any intermediate computation results of the other participant. Therefore, in practical applications, the step of processing, by the first participant and the second participant, the first private transposed matrix, the second private transposed matrix, the first private matrix, and the second private matrix by using the secure two-party matrix hybrid multiplication protocol to obtain the matrix $\partial_1$ and the matrix $\partial_2$ specifically includes the following steps:

The first participant and the second participant process the first private transposed matrix and the second private matrix by using a secure two-party matrix multiplication protocol, to obtain a matrix $V_{a1}$ and a matrix $V_{b1}$. The matrix $V_{a1}$ is stored in the first participant, and the matrix $V_{b1}$ is stored in the second participant.

The first participant computes a product of the first private matrix and the first private transposed matrix, to obtain a matrix $V_{a0}$.

The first participant and the second participant process the first private matrix and the second private transposed matrix by using the secure two-party matrix multiplication protocol, to obtain a matrix $V_{a2}$ and a matrix $V_{b2}$. The matrix $V_{a2}$ is stored in the first participant, and the matrix $V_{b2}$ is stored in the second participant.

The second participant computes a product of the second private matrix and the second private transposed matrix, to obtain a matrix $V_{b0}$.

The first participant obtains the matrix $\partial_1$ based on the matrix $V_{a1}$, the matrix $V_{a2}$, and the matrix $V_{a0}$.

The second participant obtains the matrix $\partial_2$ based on the matrix $V_{b1}$, the matrix $V_{b2}$, and the matrix $V_{b0}$.

The secure two-party matrix inversion protocol (2PIP), as the name suggests, assumes the presence of two mutually distrusting participants. The two participants hold secret input matrices $\partial_1$ and $\partial_2$, respectively, and jointly execute a two-party inversion protocol $f(\partial_1, \partial_2)=\text{Output}(u_1, u_2)=(\partial_1+\partial_2)^{-1}$. Eventually, the two participants obtain corresponding outputs $v_1$, $v_2$ respectively, and the outputs satisfy $u_1+u_2=(\partial_1+\partial_2)^{-1}$. Throughout the entire computation process, each participant node only has knowledge of the input and output data involved in its own computation process and cannot access any intermediate computation results of the other participant. Therefore, in practical applications, the step of processing, by the first participant and the second participant, the matrix $\partial_1$ and the matrix $\partial_2$ by using the secure two-party matrix inversion protocol, to obtain the matrix $u_1$ and the matrix $u_2$ specifically includes the following steps:

The first participant randomly generates a secret matrix P, and obtains a matrix $I_A$ based on the secret matrix P and the matrix $\partial_1$.

The second participant randomly generates a secret matrix Q, and obtains a matrix $I_B$ based on the matrix $\partial_2$ and the secret matrix Q.

The first participant and the second participant process the matrix $I_A$ and the secret matrix Q by using the secure two-party matrix multiplication protocol, to obtain a matrix $V_{a1}'$ and a matrix $V_{b1}'$. The matrix $V_{a1}'$ is stored in the first participant, and the matrix $V_{b1}'$ is stored in the second participant.

The first participant and the second participant process the secret matrix P and the matrix $I_B$ by using the secure two-party matrix multiplication protocol, to obtain a matrix $V_{a2}'$ and a matrix $V_{b2}''$. The matrix $V_{a2}'$ is stored in the first participant, and the matrix $V_{b2}''$ is stored in the second participant.

The first participant obtains the matrix $V_a$ based on the matrix $V_{a1}'$ and the matrix $V_{a2}'$, and sends the matrix $V_a$ to the second participant.

The second participant obtains a matrix $I_B^*$ based on the secret matrix Q, the matrix $V_a$, the matrix $V_{b1}'$, and the matrix $V_{b2}'$.

The first participant and the second participant process the secret matrix P and the matrix $I_B^*$ by using the secure two-party matrix multiplication protocol, to obtain the matrix $u_1$ and the matrix $u_2$.

In practical applications, the step of processing, by the first participant and the second participant, the matrix $\partial_1$ and the matrix $\partial_2$ by using the secure two-party matrix inversion protocol, to obtain the matrix $u_1$ and the matrix $u_2$ specifically includes the following steps:

The first participant randomly generates a reversible matrix P' and a reversible matrix Q'.

The first participant and the second participant obtain a matrix $V_{a1}'''$ and a matrix $V_{b1}'''$ based on the reversible matrix P' and the matrix $\partial_2$ by using the secure two-party matrix multiplication protocol. The matrix $V_{a1}'''$ is stored in the first participant, and the matrix $V_{b1}'''$ is stored in the second participant.

The first participant and the second participant obtain a matrix $V_{a2}'''$ and a matrix $V_{b2}'''$ based on the reversible matrix Q' and the matrix $V_{b1}'''$ by using the secure two-party matrix multiplication protocol. The matrix $V_{a2}'''$ is stored in the first participant, and the matrix $V_{b2}'''$ is stored in the second participant.

The first participant obtains a matrix $V_a''$ based on the matrix $V_{a1}'''$, matrix Q', matrix $V_{a2}'''$, matrix P', and matrix $\partial_1$, and sends the matrix $V_a''$ to the second participant.

The second participant obtains a matrix T'' based on the matrix $V_a''$ and the matrix $V_{b2}'''$, and computes an inverse matrix of the matrix T''.

The first participant and the second participant obtains a matrix $V_{a3}'$ and a matrix $V_{b3}'$ based on the matrix Q' and the inverse matrix of the matrix T'' by using the secure two-party matrix multiplication protocol. The matrix $V_{a3}'$ is stored in the first participant, and the matrix $V_{b3}''$ is stored in the second participant.

The first participant and the second participant obtain a matrix $V_{a4}$ and a matrix $V_{b4}$ based on the matrix P' and the matrix $V_{b3}'$ by using the secure two-party matrix multiplication protocol.

The second participant computes the matrix $u_2$ based on the matrix $V_{b4}$.

The first participant obtains the matrix $u_1$ based on the matrix $V_{a3}'$, the matrix P', and the matrix $V_{a4}$.

The secure three-party matrix hybrid multiplication protocol (3PHMP), as the name suggests, assumes the presence of three mutually distrusting participants. The three participant hold corresponding secret input matrices $(u_1, v_1)$, $(u_2, v_2)$, z, respectively, and jointly execute a two-party hybrid multiplication protocol $f((u_1, v_1), (u_2, v_2), z)=\text{Output}(V_a', V_b', V_c)=(u_1+u_2)\cdot(v_1+v_2)\cdot z$. Eventually, the participants obtain their corresponding outputs $V_a'$, $V_b'$, $V_c$ respectively, and the outputs satisfy $V_a'+V_b'+V_c=(u_1+u_2)\cdot(v_1+v_2)\cdot z$. Throughout the entire computation process, each participant node only has knowledge of the input and output data involved in its own computation process and cannot access any intermediate computation results of the other participants. Therefore, in practical applications, the step of processing, by the requester of the secure three-party linear regression computation, the first participant, the second participant, and the third participant, the first private matrix sequence, the second private matrix sequence, and the third private matrix by using the secure three-party matrix hybrid multiplication protocol, to obtain the regression coefficient matrix of the secure three-party linear regression model specifically includes the following steps:

The first participant computes a matrix A* based on the first private matrix sequence, while the second participant computes a matrix B* based on the second private matrix sequence.

The first participant and the third participant obtain a matrix $V_{a0}'$ and a matrix $V_{c0}$ based on the matrix A* and the third private matrix by using the secure two-party matrix multiplication protocol. The matrix $V_{a0}'$ is stored in the first participant, and the matrix $V_{c0}$ is stored in the third participant. The second participant and the third participant obtain a matrix $V_{b3}$ and a matrix $V_{c3}$ based on the matrix B* and the third private matrix by using the secure two-party matrix multiplication protocol. The matrix $V_{b3}$ is stored in the second participant, and the matrix $V_{c3}$ is stored in the third participant. Additionally, the first participant, the second participant, and the third participant obtain a matrix $V_{a1}''$, a matrix $V_{b1}"$, and a $V_{c1}$ based on the matrix $u_1$, the random matrix $v_2$, and the third private matrix by using a secure three-party matrix multiplication protocol. The matrix $V_{a1}"$ is stored in the first participant, the matrix $V_{b1}"$ is stored in the second participant, and the matrix $V_{c1}$ is stored in the third participant. Meanwhile, the second participant, the first participant, and the third participant obtain a matrix $V_{a2}"$, a matrix $V_{b2}"$, and a matrix $V_{c2}$ based on the matrix $u_2$, the random matrix $v_1$, and the third private matrix by using the secure three-party matrix multiplication protocol. The matrix $V_{a2}"$ is stored in the first participant, the matrix $V_{b2}"$ is stored in the second participant, and the matrix $V_{c2}$ is stored in the third participant.

The first participant obtains a matrix $V_a'$ based on the matrix $V_{a0}'$, the matrix $V_{a1}"$, and the matrix $V_{a2}"$ and sends the matrix $V_a'$ to the requester of the secure three-party linear regression computation.

The second participant obtains a matrix $V_b'$ based on the matrix $V_{b1}"$, the matrix $V_{b2}"$, and the matrix $V_{b3}$ and sends the matrix $V_b'$ to the requester of the secure three-party linear regression computation.

The third participant obtains a matrix $V_c$ based on the matrix $V_{c0}$, the matrix $V_{c1}$, the matrix $V_{c2}$, and the matrix $V_{c3}$ and sends the matrix $V_c$ to the requester of the secure three-party linear regression computation.

The requester of the secure three-party linear regression computation obtains the regression coefficient matrix of the secure three-party linear regression model based on the matrix $V_a'$, the matrix $V_b'$, and the matrix $V_c$.

The secure two-party matrix multiplication protocol (2PMP), as the name suggests, assumes the presence of two mutually distrusting participants. The two participants hold secret input matrices, x and y, respectively, and jointly execute a two-party multiplication protocol $f(x, y)=$Output $(F_1, F_2)=x \cdot y$. Eventually, the two participants obtain their corresponding outputs $F_1, F_2$ respectively, and the outputs satisfy $F_1+F_2=x \cdot y$. Throughout the entire calculation process, each participant only has knowledge of the input and output data involved in its own computation process and cannot access any intermediate computation results of the other participants. Therefore, in practical applications, the step of processing, by the first participant and the second participant, the first private transposed matrix and the second private matrix by using the secure two-party matrix multiplication protocol to obtain the matrix $V_{a1}$ and the matrix $V_{b1}$ specifically includes the following steps:

An auxiliary computing node generates two random matrix pairs $(R_a, r_a)$ and $(R_b, r_b)$, and sends the random matrix pair $(R_a, r_a)$ to the first participant and the random matrix pair $(R_b, r_b)$ to the second participant.

The first participant obtains a matrix $\hat{A}$ based on the matrix $R_a$ and the first private transposed matrix, and sends the matrix $\hat{A}$ to the second participant.

The second participant obtains a matrix $\hat{B}$ based on the matrix $R_b$ and the second private matrix, and sends the matrix $\hat{B}$ to the first participant.

The second participant randomly generates a matrix $V_{b1}$, generates a matrix T based on the matrix $\hat{A}$, the second private matrix, the matrix $r_b$, and the matrix $V_{b1}$, and sends the matrix T to the first participant.

The first participant obtains the matrix $V_{a1}$ based on the matrix T, the matrix $r_a$, the matrix $R_a$, and the matrix $\hat{B}$.

In practical applications, the step of obtaining, by the second participant, the matrix $I_B*$ based on the secret matrix Q, the matrix $V_a$, the matrix $V_{b1}'$, and the matrix $V_{b2}'$ specifically includes the following steps:

The second participant obtains a matrix $V_b$ based on the matrix $V_{b1}'$ and the matrix $V_{b2}'$.

Based on the matrix $V_b$ and the matrix $V_a$, a matrix T' is obtained.

Based on an inverse matrix of the matrix T' and the secret matrix Q, the matrix $I_B*$ is obtained.

The secure three-party matrix multiplication protocol (3PMP), as the name suggests, assumes the presence of three mutually distrusting participants. The three participants hold secret input matrices x', y', and z', respectively, and jointly execute a three-party multiplication protocol $f(x', y', z')=$Output $(E_1, E_2, E_3)=x' \cdot y' \cdot z'$. Eventually, the three participants obtain their corresponding outputs $E_1, E_2, E_3$ respectively, and the outputs satisfy $E_1+E_2+E_3=x' \cdot y' \cdot z'$. Throughout the entire calculation process, each participant only has knowledge of the input and output data involved in its own computation process and cannot access any intermediate computation results of the other participants. Therefore, in practical applications, the step of obtaining, by the first participant, the second participant, and the third participant, the matrix $V_{a1}"$, the matrix $V_{b1}"$, and the matrix $V_{c1}$ based on the matrix $u_1$, the random matrix $v_2$, and the third private matrix by using the secure three-party matrix multiplication protocol specifically includes the following steps:

An auxiliary computing node randomly generates three random matrix pairs $(R_a', r_a')$, $(R_b', r_b')$, and $(R_c, r_c)$, and sends the random matrix pair $(R_a', r_a')$ to the first participant, the random matrix pair $(R_b', r_b')$ to the second participant, and the random matrix pair $(R_c, r_c)$ to the third participant.

The first participant obtains a matrix $\hat{A}'$ based on the matrix $R_a'$ and the matrix $u_1$ and sends the matrix $\hat{A}'$ to the second participant.

The third participant obtains a matrix $\hat{C}$ based on the matrix $R_c$ and the third private matrix and sends the matrix $\hat{C}$ to the second participant.

The second participant obtains a matrix $\hat{B}'$ based on the matrix $R_b'$ and the random matrix $v_2$ and determines whether the matrix $\hat{B}'$ is full rank, to obtain a first determining result.

If the first determining result is no, the process returns to the step that "an auxiliary computing node randomly generates three random matrix pairs $(R_a', r_a')$, $(R_b', r_b')$, and $(R_c, r_c)$, and sends the random matrix pair $(R_a', r_a')$ to the first participant, the random matrix pair $(R_b', r_b')$ to the second participant, and the random matrix pair $(R_c, r_c)$ to the third participant."

If the first determining result is yes, the second participant obtains a matrix My based on the matrix $\hat{A}'$, the matrix $R_b'$, and the matrix $\hat{C}$, computes a matrix $\varphi_1$ based on the matrix $\hat{A}'$ and the matrix $\hat{B}'$, obtains a matrix $\gamma_1$ based on the matrix $\hat{A}'$ and the matrix $R_b'$, computes a matrix $\varphi_2$ based on the matrix $\hat{B}'$ and the matrix $\hat{C}$, and computes a matrix $\gamma_2$ based on the matrix $R_b'$ and the matrix $\hat{C}$. The matrix $\varphi_1$ and the matrix $\gamma_1$ are sent to the third participant, while the matrix $\varphi_2$ and the matrix $\gamma_2$ are sent to the first participant.

The first participant computes a matrix $S_a$ based on the matrix $R_a'$ and the matrix $\gamma_2$, and computes a matrix $M_a$ based on the matrix $u_1$ and the matrix $\varphi_2$.

The third participant computes a matrix $S_c$ based on the matrix $\gamma_1$ and the matrix $R_c$, and computes a matrix $M_c$ based on the matrix $\varphi_1$ and the matrix $R_c$.

The second participant performs a full-rank decomposition on the matrix $\hat{B}'$ to obtain a column full-rank matrix and a row full-rank matrix, and sends the column full-rank matrix to the first participant, and the row full-rank matrix to the third participant.

The first participant randomly generates the matrix $V_{a1}"$, obtains a matrix $T_a$ based on the matrix $M_a$, the matrix $S_a$, the matrix $V_{a1}''$, and the matrix $r_a$, obtains a matrix $t_1$ based on the matrix $R_a'$ and the column full-rank matrix, and sends the matrix $T_a$ and the matrix $t_1$ to the second participant.

The third participant obtains a matrix $t_2$ based on the row full-rank matrix and the matrix $R_c$, and sends the matrix $t_2$ to the second participant.

The second participant randomly generates the matrix $V_{b1}''$, obtains a matrix $S_b$ based on the matrix $t_1$ and the matrix $t_2$, obtains a matrix $T_b$ based on the matrix $T_a$, the matrix $M_b$, the matrix $S_b$, the matrix $V_{b1}''$, and the matrix $r_b$, and sends the matrix $T_b$ to the third participant.

The third participant obtains the matrix $V_{c1}$ based on the matrix $T_b$, the matrix $M_c$, the matrix $S_c$, and the matrix $r_c$.

The present disclosure provides a more specific embodiment to detail the above method, which is specifically as follows:

Linear regression is an important and fundamental machine learning algorithm that characterizes the relationship between an output and multiple inputs. It is one type of supervised learning and finds extensive applications in data mining. In practice, training a linear regression model typically relies on a large amount of data, which is often held by different organizations and contains private information of users. Therefore, when multiple computing parties aim to obtain a better-performing model through a substantial amount of data without revealing each other's data privacy, it inevitably involves the privacy-preserving computation of the secure multi-party linear regression problem.

The secure three-party linear regression problem is defined as follows:

A dataset $M \in R^{m \times (n+1)}$ containing m sample points $\{X, Y\} = \{(x_{i,1}, x_{i,2}, \ldots x_{i,n}, y_i) | 1 \le i \le m\}$ is given, where $x_{i,1} \sim x_{i,n}$ correspond to n feature variables of the i-th sample point, and $y_i$ corresponds to a label variable of the i-th sample point. $X \in R^{m \times n}$ represents a sample set matrix with n features, and $Y \in R^{m \times 1}$ represents label vectors corresponding to m sample points. It is known that there exist three independent and mutually distrusting computation participants: Alice, Bob, Carol. In an environment where a dataset is heterogeneously split randomly, X is randomly split into $A_{m \times n}$ and $B_{m \times n}$. The participant Alice possesses a private data matrix $A_{m \times n} = \{x_{i,j} | 1 \le i \le m, 1 \le j \le n\}$ containing n feature variables. The participant Bob possesses a private data matrix $B_{m \times n} = \{x_{i,j} | 1 \le i \le m, 1 \le j \le n\}$ containing n feature variables. The participant Carol possesses a private data matrix $Y_{m \times 1} = \{y_1, y_2, y_3 \ldots, y_m\}$ containing m sample point labels. The private data matrices A, B, and C satisfy relationship 1 in terms of set element distribution: $\{A \cup B \cup C = M\}$; the private matrices A and B satisfy relationship 2 in terms of a horizontal feature index $ID_{sample}$ and a vertical sample index $ID_{feature}$: $\{[ID_{sample}(A) \cap ID_{sample}(B) = \emptyset]$ & $[ID_{feature}(A) \cap ID_{feature}(B) = \emptyset]\}$. The three participants aim to jointly execute a secure three-party linear regression protocol to achieve secure inference $f(A, B, Y) = \beta = W_a + W_b + W_c$ of parameters of the linear regression model for heterogeneous distributed data sets without exposing their individual data information. Eventually, each computation participant obtains its corresponding m×1-dimensional regression coefficient slice matrix $\{W_i | i \in <a, b, c>\}$, and a $\beta$ regression coefficient result of the secure three-party linear regression model is obtained after aggregation of the regression coefficient slice matrices sent to the computation requester. Throughout the entire computation process, the private data matrices of the participants should remain local. Each node is semi-honest, strictly follows the computation protocol steps, and cannot access any intermediate computation results or original data information held by the other participants. The formal description of the problem is shown in FIG. 1.

The secure two-party matrix multiplication protocol (2PMP) problem is defined as follows:

It is known that there are two computation participants, Alice and Bob, which are independent of each other and mutually distrusting. Alice holds an n×s-dimensional private data matrix A that is only stored in its own computing node, and Bob holds an s×m-dimensional private data matrix B. The two participants expect to achieve $f(A, B) = AB = Q_a + Q_b$ by jointly executing a secure matrix multiplication protocol. Eventually, the computation participant nodes obtain their corresponding n×m-dimensional output matrices $Q_a$ and $Q_b$, and send the output matrices to the computation requester, who aggregates the output matrices to obtain an expected two-party matrix multiplication result. During the computation process, each participant node can only obtain its own input/output information, and cannot access any intermediate computation results or data information held by the other participant.

The protocol flow specifically includes the following steps:

Step 1: An auxiliary computing node, also referred to as a commodity server (CS), generates two random matrix pairs, which are an n×s-dimensional random matrix $R_a$, an s×m-dimensional random matrix $R_b$, and two n×m-dimensional random matrices $r_a$, $r_b$. These random matrices need to strictly meet the following constraint $r_a + r_b = R_a \cdot R_b$. Then, the CS auxiliary node sends the random matrix pair $(R_a, r_a)$ to the participant computing node Alice, and the random matrix pair $(R_b, r_b)$ to the participant computing node Bob.

Step 2: After receiving the corresponding random matrix pair $(R_a, r_a)$, the participant node Alice computes $\hat{A} = A + R_a$ internally and sends it the to the participant node Bob.

Step 3: After receiving the corresponding random matrix pair $(R_b, r_b)$, the participant node Bob computes $\hat{B} = B + R_b$ internally and sends it to the participant node Alice.

Step 4: After receiving the matrix $\hat{A}$ sent from the node Alice, the participant node Bob internally generates a random matrix $Q_b \in R^{n \times m}$ secretly, secretly computes a matrix $T = \hat{A} \cdot B + (r_b - Q_b)$ locally, and sends it to the node Alice.

Step 5: After receiving T, the participant node Alice secretly computes a matrix $Q_a = T + r_a - (R_a \cdot \hat{B})$ locally.

The secure three-party matrix multiplication protocol (3PMP) problem is defined as follows:

It is known that there are three participants, Alice, Bob, Carol, which are independent of each other and mutually distrusting. Alice holds an n×s-dimensional private data matrix A' that is only stored in its own computing node, Bob holds an s×t-dimensional private data matrix B', and Carol holds a t×m-dimensional private data matrix C'. The three participants jointly perform a three-party matrix multiplication protocol computation $f(A', B', C') = A'B'C' = Q'_a + Q'_b + Q'_c$, and finally the computation participant nodes obtain their respective n×m-dimensional output matrices $Q'_a$, $Q'_b$, $Q'_c$, which are sent to the computation requester, who aggregates the output matrices to obtain an expected result of three-party matrix multiplication. During the computation process, each participant node can only obtain its own input/output information, and cannot access any intermediate computation results or data information held by the other participants.

The protocol flow specifically includes the following steps:

Step 1: An auxiliary computing node, also referred to as a commodity server (CS) node, generates three random matrix pairs. Specific forms of the three random matrix pairs are as follows: an n×s-dimensional random matrix $R_a'$, an s×t-dimensional random matrix $R_b'$, a t×m-dimensional random matrix $R_c$, and three n×m-dimensional random matrices $r_a'$, $r_b'$, and $r_c$. These random matrices need to strictly meet the following constraint $r_a'+r_b'+r_c=R_a'·R_b'·R_c$. Then, the CS auxiliary node sends a random matrix pair ($R_a'$, $r_a'$) to the participant computing node Alice, sends a random matrix pair ($R_b'$, $r_b'$) to the participant computing node Bob, and sends a random matrix pair ($R_c$, $r_c$) to the participant computing node Carol. When an entire computation protocol is performed, the CS auxiliary node needs to strictly meet the following three requirements: (1) Not contact private data information related to Alice, Bob and Carol, whether an input or output result of an intermediate computational process. (2) Not collude with any participant compute node. (3) Strictly follow a protocol process to correctly perform an assigned subtask. The CS auxiliary node does not directly participate in a subsequently actual computational process of the secure three-party multiplication, only provides a random matrix pair that is independent of a private data matrix at an initial phase for performing a protocol, thereby protecting information of a private matrix of a participant and ensuring security of raw data in a subsequent computational process. Therefore, the auxiliary node CS may generate a large quantity of mutually independent random matrix pairs offline in advance, and send random seeds to Alice, Bob, and Carol compute nodes in an initial trial phase for performing a protocol in a manner similar to commodity sale, so that the compute node can obtain corresponding random matrix information, and the commodity server CS gets its name.

Step 2: After receiving the corresponding random matrix pair ($R_a'$, $r_a'$), the participant node Alice computes $Â'=A'+R_a'$ internally and sends it the to the participant node Bob.

Step 3: After receiving the corresponding random matrix pair ($R_c$, $r_c$), the participant node Carol computes $Ĉ=C'+R_c$ internally and sends it to the participant node Bob.

Step 4: After receiving the corresponding random matrix pair ($R_b'$, $r_b'$), the participant node Bob computes $B̂'=B'+R_b'$ internally and synchronously verifies whether the matrix $B̂'$ is a non-full rank matrix, and if not, returns to step 1 to reselect a random matrix pair until the condition is met, then continues to compute a matrix $M_b=Â'·R_b'·C$, sends $\varphi_1=Â'·B̂'$ and $\gamma_1=Â'·R_b'$ to the node Carol, and sends $\varphi_2=B̂'·Ĉ$ and $\gamma_2=R_b'·Ĉ$ to the node Alice.

Step 5: After receiving the matrix $\varphi_2$, $\gamma_2$ sent from the node Bob, the participant node Alice successively computes $S_a=R_a'·\gamma_2=R_a'·R_b'·Ĉ$ and $M_a=A'·\varphi_2=A'·B'·Ĉ$ locally.

Step 6: After receiving the matrix $\varphi_1$, $\gamma_1$ sent from the node Bob, the participant node Carol successively computes $S_c=\gamma_1·R_c=Â'·R_b'·R_c$ and $M_c=\varphi_1·R_c=Â'·B'·R_c$ locally.

Step 7: The participant node Bob internally splits the matrix $B̂'$ in a manner of full rank decomposition, to obtain a column full rank matrix $B_1 \in R^{s \times r}$ and a row full rank matrix $B_2 \in R^{r \times t}$, where ranks of the non-zero matrix $B̂'$ and the split matrices $B_1$, $B_2$ meet a constraint condition rank($B̂'$)=rank($B_1$)=rank($B_2$)=r. The node Bob sends the matrix $B_1$ to the node Alice, and sends the matrix $B_2$ to the node Carol.

Step 8: After receiving the matrix $B_1$ from the node Bob, the participant node Alice internally generates a random matrix $Q_a \in R^{n \times m}$ secretly, computes $T_a=M_a+S_a-Q_a-r_a$ and $t_1=R_a'B_1$ locally, and sends $T_a$ and $t_1$ to the node Bob.

Step 9: After receiving the matrix $B_2$ from the node Bob, the participant node Carol secretly computes $t_2=B_2R_c$, and sends a result $t_2$ to the node Bob.

Step 10: After receiving the matrices $T_a$ and $t_1$ sent from the node Alice and the matrix $t_2$ sent from the node Carol, the participant node Bob internally generates a random matrix $Q_b \in R^{n \times m}$ secretly, secretly computes a matrix $S_b=t_1·t_2=R_a'B_1·B_2R_c=R_a'B̂'R_c$ locally, finally computes $T_b=T_a-M_b+S_b-Q_b-r_b$, and sends it to the node Carol.

Step 11: After receiving $T_b$, the participant node Carol secretly computes a matrix $Q_c=T_b-M_c+S_c-r_c$ locally.

The secure two-party matrix inversion protocol (2PIP) problem is defined as follows:

It is known that there are two computation participants, Alice and Bob, which are independent of each other and mutually distrusting. Alice holds a private data matrix $\partial_1 \in R^{n \times n}$ that is only stored in its own computing node, and Bob holds a private data matrix $\partial_2 \in R^{n \times n}$. The two participants jointly execute a two-party matrix inversion protocol computation $f(\partial_1, \partial_2)=(\partial_1+\partial_2)^{-1}=u_1+u_2$. Eventually, the two participant nodes of the computation obtain their corresponding output matrices $u_1$, $u_2 \in R^{n \times n}$ respectively, and send the output matrices to the computation requester, who aggregates the output matrices to obtain an expected result of the two-party matrix inversion. During the computation process, each participant node can only access input/output information related to its own computation process, and cannot access any intermediate computation results or private data information held by the other participant.

The protocol flow specifically includes the following steps:

When the private reversible matrices P, $Q \in R^{n \times n}$ belong to different participant nodes, without loss of generality, the private matrix P belonging to the participant node Alice and the private matrix Q belonging to the participant node Bob is taken as an example for description herein. It is known that the participant node Alice holds a private matrix $\partial_1 \in R^{n \times n}$, and the participant node Bob holds a private matrix $\partial_2 \in R^{n \times n}$.

Step 1: The participant node Alice secretly generates a random reversible matrix $P \in R^{n \times n}$ locally, and secretly computes a matrix $I_A=P \times \partial_1$ locally.

Step 2: The participant node Bob secretly generates a random reversible matrix $Q \in R^{n \times n}$ locally, and secretly computes a matrix $I_B=\partial_2 \times Q$ locally.

Step 3: The participant node Alice and the participant node Bob input their respective private matrices $I_A$ and Q based on the secure two-party matrix multiplication protocol 2PMP, to perform the first round of secure two-party matrix multiplication. After execution of the 2PMP protocol is completed, the computation result will be randomly split into matrices $V_{a1}'$, $V_{b1}' \in R^{n \times n}$ according to the random obfuscation technique, which are sent to the participant node Alice and the participant node Bob respectively. The two private output matrices satisfy the following relation: $V_{a1}'+V_{b1}'=(P\partial_1) \times Q$.

Step 4: The participant node Alice and the participant node Bob input their respective private matrices P and $I_B$ based on the secure two-party matrix multiplication protocol 2PMP, to perform the second round of secure two-party matrix multiplication. After execution of the 2PMP protocol is completed, the computation result will be randomly split into matrices $V_{a2}'$, $V_{b2}' \in R^{n \times n}$ according to the random obfuscation technique, which are sent to the participant node Alice and the participant node Bob respectively. The two private output matrices satisfy the following relation: $V_{a2}'+V_{b2}'=P \times (\partial_2 Q)$.

Step 5: The participant node Alice secretly computes a matrix $V_a=V_{a1}'+V_{a2}'$ locally, and sends the private matrix $V_a \in R^{n \times n}$ to the participant node Bob.

Step 6: The participant node Bob secretly computes a matrix $V_b=V_{b1}'+V_{b2}'$ locally, aggregates the local matrix with the private matrix sent from the node Alice to obtain $T'=V_a+V_b$, then performs inversion secretly to obtain a matrix $T'^{-1}=Q^{-1}(V_a+V_b)^{-1}P^{-1}$, where $T'^{-1}\in R^{n\times n}$, and further computes a private matrix $I_B^*=QT'^{-1}$.

Step 7: The participant node Alice and the participant node Bob input their respective private matrices P and Ig based on the secure two-party matrix multiplication protocol, to perform the third round of secure two-party matrix multiplication to obtain a matrix $u_1$ and a matrix $u_2$. After execution of the 2PMP protocol is completed, the computation result will be randomly split into matrices $U_a$, $U_b$ $\in R^{n\times n}$ according to the random obfuscation technique, which are sent to the participant node Alice and the participant node Bob respectively. The two private output matrices satisfy the following relation: $U_a+U_b=Q\times T^{-1}\times P$.

The foregoing secure two-party matrix inversion protocol is designed based on the case where the private reversible matrices P, $Q\in R^{n\times n}$ belong to different computation participants. Specifically, the private matrix P belongs to the participant node Alice, and the private matrix Q belongs to the participant node Bob. Therefore, the present disclosure further provides a secure two-party matrix inversion protocol based on the case where private reversible matrices P', $Q'\in R^{n\times n}$ belong to the same computation participant Alice. It is known that the participant node Alice holds a private matrix $\partial_1\in R^{n\times n}$, and the participant node Bob holds a private matrix $\partial_2\in R^{n\times n}$. The specific process of the solution is as follows:

Step 1: The participant node Alice secretly generates two random invertible matrices P', $Q'\in R^{n\times n}$ locally.

Step 2: The participant node Alice and the participant node Bob input their respective private matrices P' and $\partial_2$ based on the secure two-party matrix multiplication protocol 2PMP, to perform the first round of secure two-party matrix multiplication. After execution of the 2PMP protocol is completed, the computation result will be randomly split into matrices $V_{a1}'''$, $V_{b1}'''\in R^{n\times n}$ according to the random obfuscation technique, which are sent to the participant node Alice and the participant node Bob respectively. The two private output matrices satisfy the following relation: $V_{a1}'''+V_{b1}'''=P'\times\partial_2$.

Step 3: The participant node Alice and the participant node Bob jointly perform the second round of secure two-party matrix multiplication, where an input from the participant node Bob is the private data matrix $V_{b1}'''$ returned in step 2, and an input from the participant node Alice is the private data matrix Q'. After execution of the 2PMP protocol is completed, the computation result will be randomly split into two private matrices $V_{a2}'''$, $V_{b2}'''\in R^{n\times n}$, which are sent to the participant nodes Alice and Bob respectively. The two private matrices satisfy the following relation: $V_{a2}'''+V_{b2}'''=V_{b1}'''\times Q'$.

Step 4: The participant node Alice secretly computes a matrix $V_a''=V_{a1}'''\times Q'+V_{a2}'''+P'\times\partial_1\times Q'$ locally, and then sends the private matrix $V_a''\in R^{n\times n}$ to the participant node Bob.

Step 5: The participant node Bob secretly computes a matrix $T''=V_a''+V_{b2}'''=(V_{a2}'''+V_{a1}'''\times Q'+P'\times\partial_1\times Q')+V_{b2}'''=P'(\partial_1+\partial_2)Q'$ locally, where the matrix $T''\in R^{n\times n}$.

Step 6: The participant node Bob further secretly computes an inverse matrix $T''^{-1}=Q'^{-1}(\partial_1+\partial_2)^{-1}P'^{-1}$ of the matrix T'' locally, where $T''^{-1}\in R^{n\times n}$.

Step 7: The participant node Alice and the participant node Bob jointly perform the third round of secure two-party matrix multiplication, where the participant node Alice inputs the matrix Q' based on the 2PMP protocol, and the participant node Bob inputs the matrix $T''^{-1}$ based on the 2PMP protocol. After execution of the 2PMP protocol is completed, the computation result will be randomly split into two private matrices $V_{a3}'$, $V_{b3}'\in R^{n\times n}$, which are sent to the participant nodes Alice and Bob respectively. The two private matrices satisfy the following relation: $V_{a3}'+V_{b3}'=Q'\times T''^{-1}$.

Step 8: The participant node Alice and the participant node Bob jointly perform the fourth round of secure two-party matrix multiplication, where an input from the participant node Alice is the private data matrix P' returned in step 7, and an input from the participant node Bob is the private data matrix $V_{b3}'$. After execution of the 2PMP protocol is completed, the computation result will be randomly split into two private matrices $V_{a4}$, $V_{b4}\in R^{n\times n}$, which are sent to the participant nodes Alice and Bob respectively. The two private matrices satisfy the following relation: $V_{a4}+V_{b4}=V_{b3}'\times P'$.

Step 9: The participant node Bob locally stores the private matrix $V_{b4}$ returned in Step 8 as $u_2$, and the participant node Alice secretly computes a matrix $u_1=V_{a3}'\times P'+V_{a4}$ locally.

The secure two-party matrix hybrid multiplication protocol (2PHMP) problem is defined as follows:

It is known that are two computation participants, Alice and Bob, which are independent of each other and mutually distrusting. Alice holds a set of private data matrices $X_1^T\in R^{m\times t}$ and $X_1\in R^{t\times n}$ that are only stored in its own computing node, and Bob holds a set of private data matrices $X_2^T\in R^{m\times t}$ and $X_2\in R^{t\times n}$ that are only stored in its own computing node. The two participants jointly execute a two-party matrix hybrid multiplication protocol $f((X_1^T, X_1), (X_2^T, X_2))=(X_1^T+X_2^T)\times(X_1+X_2)=\partial_1+\partial_2$. Eventually, the two participant nodes of the computation obtain their corresponding output matrices $\partial_1$, $\partial_2\in R^{m\times n}$ respectively, and send the output matrices to the computation requester, who aggregates the output matrices to obtain an expected result of the two-party matrix hybrid multiplication. During the computation process, each participant node can only access input/output information related to its own computation process, and cannot access any intermediate computation results or private data information held by the other participant.

The protocol is specifically described as follows:

The secure two-party matrix hybrid multiplication problem typically arises in the intermediate computation process of multi-party modeling problems, with the form of two-party hybrid multiplication being quite common. For instance, in the intermediate computation process of scenarios such as regression and clustering problems, the form of overlaying and multiplying intermediate computation result matrices of the two parties. Without loss of generality, it is assumed that in this protocol, the computation participant node Alice has initial input matrices with dimensions $X_1^T\in R^{m\times t}$ and $X_1\in R^{t\times n}$, and the computation participant node Bob has initial input matrices with dimensions $X_2^T\in R^{m\times t}$ and $X_2\in R^{t\times n}$. Based on this, a high-speed parallel secure two-party hybrid multiplication protocol is proposed, which includes the following process.

Step 1: The participant node Alice and the participant node Bob input their respective private matrices $X_1^T\in R^{m\times t}$ and $X_2\in R^{t\times n}$ based on the secure two-party matrix multiplication protocol 2PMP, to perform the first round of secure two-party matrix multiplication. After execution of the 2PMP protocol computation is completed, the intermediate computation result of this round will be randomly split into matrices $V_{a1}$, $V_{b1}\in R^{m\times n}$ according to the random obfuscation technique, which are sent to the participant node Alice and the participant node Bob respectively. The two private output matrices satisfy the following relation: $V_{a1} + V_{b1} = X_1^T \times X_2$.

Step 2: The participant node Alice locally performs private matrix multiplication $V_{a0} = X_1^T \times X_1$ in parallel, and after the computation is finished, stores the result in a private storage space within the node Alice.

Step 3: The participant node Alice and the participant node Bob input their respective private matrices $X_1 \in R^{m \times t}$ and $X_2^T \in R^{t \times n}$ based on the secure two-party matrix multiplication protocol 2PMP, to perform the second round of secure two-party matrix multiplication. After execution of the 2PMP protocol computation is completed, the intermediate result of this round of computation will be randomly split into matrices $V_{a2}$, $V_{b2} \in R^{m \times n}$ according to the random obfuscation technique, which are sent to the participant node Alice and the participant node Bob respectively. The two private output matrices satisfy the following relation: $V_{a2} + V_{b2} = X_2^T \times X_1$.

Step 4: The participant node Bob locally performs private matrix multiplication $V_{b0} = X_2^T \times X_2$ in parallel, and after the computation is finished, stores the result in a private storage space within the node Bob.

Step 5: The participant node Alice secretly aggregates the intermediate random split matrices $V_{a1}$, $V_{a2}$ generated in the previous two rounds of 2PMP protocol execution, and performs private computation $\partial_1 = \Sigma_{1 \leq i \leq 3}[V_{ai}] = V_{a0} + V_{a1} + V_{a2}$ locally, where $\partial_1 \in R^{m \times n}$.

Step 6: The participant node Bob secretly aggregates the intermediate random split matrices $V_{b1}$, $V_{b2}$ generated in the previous two rounds of 2PMP protocol execution, and performs private computation $\partial_2 = \Sigma_{1 \leq j \leq 3}[V_{bj}] = V_{b0} + V_{b1} + V_{b2}$ locally, where $\partial_2 \in R^{m \times n}$.

The secure three-party matrix hybrid multiplication protocol (3PHMP) problem is defined as follows:

It is known that are three computation participants, Alice, Bob, and Carol, which are independent of each other and mutually distrusting. Alice holds a set of private data matrices $u_1 \in R^{m \times t}$ and $v_1 \in R^{t \times s}$ that are only stored in its own computing node, Bob holds a set of private data matrices $u_2 \in R^{m \times t}$ and $v_2 \in R^{t \times s}$ that are only stored in its own computing node, and Carol holds a private data matrix $z \in R^{s \times n}$ that is only stored in its own computing node. The three participants jointly execute a secure three-party matrix hybrid multiplication protocol $f((u_1, v_1), (u_2, v_2), z) = (u_1 + u_2) \times (v_1 + v_2) \times z = V_a' + V_b' + V_c$. Eventually, the three participant nodes of the computation obtain their corresponding output matrices $V_a'$, $V_b'$, $V_c \in R^{m \times n}$ respectively, which are sent to the computation requester, who aggregates the output matrices to obtain an expected result of the three-party matrix hybrid multiplication. During the computation process, each participant node can only access input/output information related to its own computation process, and cannot access any intermediate computation results or private data information held by the other participant.

The protocol is specifically described as follows:

The secure three-party matrix hybrid multiplication problem typically arises in multi-party modeling scenarios where label information, as private data, is not publicly disclosed. For instance, in service scenarios involving joint modeling, such as a joint assessment model for residents' health levels using multi-party medical and health examination data, an assessment model for customer risk control using customers' multi-party asset and credit data from banks, and a quantitative evaluation for multi-dimensional operational status of cities using electronic government data from organizations at all levels in smart cities, there are often numerous cases of three-party hybrid addition and multiplication of intermediate computation results. Therefore, the secure three-party matrix hybrid multiplication problem is an extension of the previous secure two-party matrix hybrid multiplication problem, and is suitable for joint modeling scenarios with higher data security requirements and stronger privacy constraints. Without loss of generality, it is assumed that in this protocol, the computation participant node Alice has initial input matrices with dimensions $u_1 \in R^{m \times t}$ and $v_1 \in R^{t \times s}$, the computation participant node Bob has initial input matrices with dimensions $u_2 \in R^{m \times t}$ and $v_2 \in R^{t \times s}$, and the computation participant node has an input matrix with dimensions $z \in R^{s \times 2}$. Based on this, a high-speed parallel secure three-party hybrid multiplication protocol is proposed, which includes the following process.

Step 1: The participant node Alice locally performs private matrix multiplication $A^* = u_1 \times v_1$, and after the computation is finished, stores the private secret matrix $A^* \in R^{m \times s}$ in a private storage space within the node Alice.

Step 2: The participant node Bob locally performs private matrix multiplication $B^* = u_2 \times v_2$ in parallel with step 1, and after the computation is finished, stores the private secret matrix $B^* \in R^{m \times s}$ in a private storage space within the node Bob.

Step 3: The participant node Alice and the participant node Carol input their respective private matrices $A^* \in R^{m \times s}$ and $z \in R^{s \times n}$ based on the secure two-party matrix multiplication protocol 2PMP, to perform the first round of secure two-party matrix multiplication. After execution of the 2PMP protocol computation is completed, the intermediate computation result of this round will be randomly split into matrices $V_{a0}'$, $V_{c0} \in R^{m \times n}$ according to the random obfuscation technique, which are sent to the participant node Alice and the participant node Carol respectively. The two private output matrices satisfy the following relation: $V_{a0}' + V_{c0} = A^* \times z$.

Step 4: The participant node Alice and the participant node Carol input their respective private matrices $B^* \in R^{m \times s}$ and $z \in R^{s \times n}$ based on the secure two-party matrix multiplication protocol 2PMP, to perform the second round of secure two-party matrix multiplication in parallel with step 3. After execution of the 2PMP protocol computation is completed, the intermediate computation result of this round will be randomly split into matrices $V_{b3}$, $V_{c3} \in R^{m \times n}$ according to the random obfuscation technique, which are sent to the participant node Bob and the participant node Carol respectively. The two private output matrices satisfy the following relation: $V_{b3} + V_{c3} = B^* \times z$.

Step 5: The participant node Alice, the participant node Bob, and the participant node Carol input their respective private matrices $u_1 \in R^{m \times t}$, $u_2 \in R^{t \times s}$ and $z \in R^{s \times n}$ based on the secure three-party matrix multiplication protocol 3PMP, to perform the third round of secure three-party matrix multiplication in parallel with steps 3 and 4. After execution of the 3PMP protocol computation is completed, the intermediate computation result of this round will be randomly split into matrices $V_{a1}''$, $V_{b1}''$, $V_{c1} \in R^{m \times n}$ according to the random obfuscation technique, which are sent to the participant node Alice, the participant node Bob, and the participant node Carol respectively. The three private output matrices satisfy the following relation: $V_{a1}'' + V_{b1}'' + V_{c1} = u_1 \times u_2 \times z$.

Step 6: The participant node Alice, the participant node Bob, and the participant node Carol input their respective private matrices $v_1 \in R^{t \times s}$, $u_2 \in R^{m \times t}$ and $z \in R^{s \times n}$ based on the secure three-party matrix multiplication protocol 3PMP, to perform the fourth round of secure three-party matrix multiplication in parallel with steps 3 to 5. After execution of the 3PMP protocol computation is completed, the intermediate result of this round of computation will be randomly split into matrices $V_{a2}'', V_{b2}'', V_{c2} \in R^{m \times n}$ according to the random obfuscation technique, which are sent to the participant node Alice, the participant node Bob, and the participant node Carol respectively. The three private output matrices satisfy the following relation: $V_{a2}''+V_{b2}''+V_{c2}=u_2 \times v_1 \times z$.

Step 7: The participant node Alice secretly aggregates the intermediate random split results $V_{a0}', V_{a1}'', V_{a2}''$ generated in the previous four rounds of parallel multiplication protocol execution, and performs private computation $V_a'=V_{a0}'+V_{a1}''+V_{a2}''$ locally, where $V_a' \in R^{m \times n}$.

Step 8: The participant node Bob secretly aggregates the intermediate random split results $V_{b1}'', V_{b2}'', V_{b3}$ generated in the previous four rounds of parallel multiplication protocol execution, and performs private computation $V_b'=V_{b1}''+V_{b2}''+V_{b3}$ locally, where $V_b' \in R^{m \times n}$.

Step 9: The participant node Carol secretly aggregates the intermediate random split results $V_{c0}, V_{c1}, V_{c2}, V_{c3}$ generated in the previous four rounds of parallel multiplication protocol execution, and performs private computation $V_c = \Sigma_{0 \leq k \leq 3}[V_{ck}] = V_{c0}+V_{c1}+V_{c2}+V_{c3}$ locally, where $V_c \in R^{m \times n}$.

Multi-Source Heterogeneous Data Co-Reconstruction Model (MHDCM)

1) There are Commonly Four Types of Data Partition Forms for Multi-Source Data Sets.

Figure 2A:
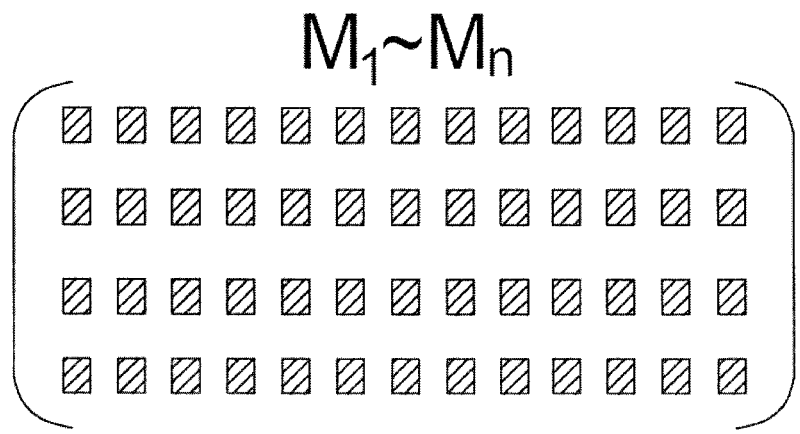
FIGS. 2A-D are schematic diagrams of four division formats of a multi-source heterogeneous dataset according to an embodiment of the present disclosure.
Figure 2B:
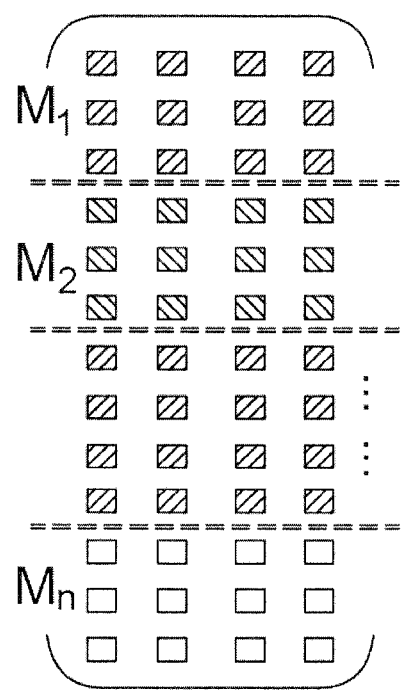
Figure 2C:
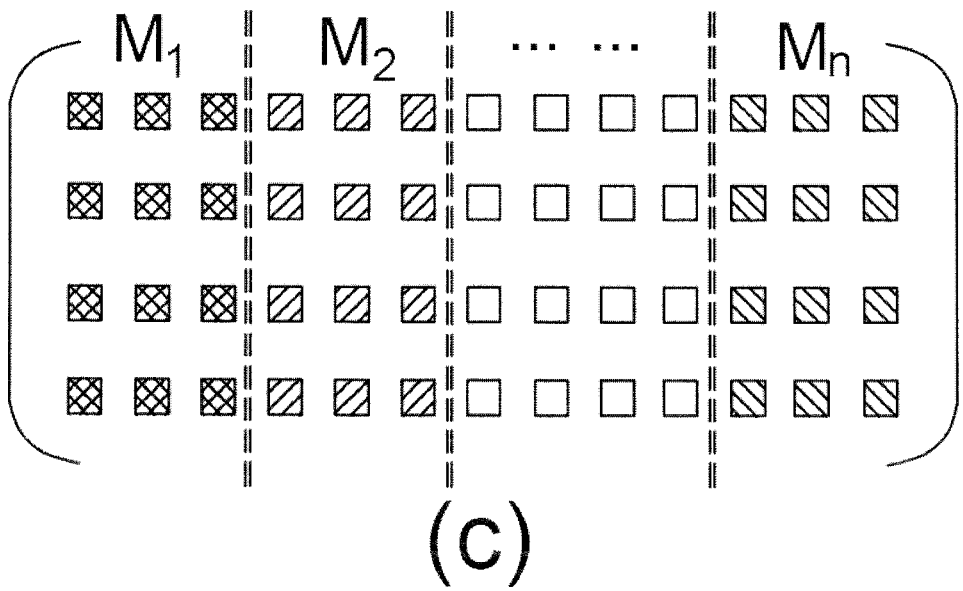
Figure 2D:
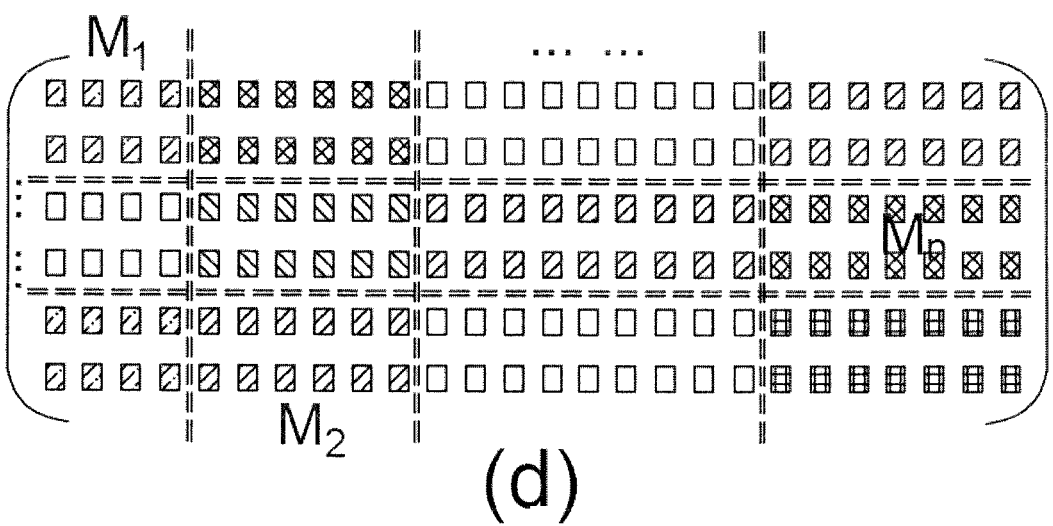

In the process of multi-party secure joint modeling, the key to achieving federated modeling lies in securely and efficiently conducting multi-party collaborative computing without leaking each party's raw data out of local databases. One of the core factors influencing the protocol design paradigm in this problem is the different data storage structures from complex data sources of multiple parties. In real-world scenarios, since initial data sets come from multiple different computation participants, such as various regulatory agencies, banks, hospitals, and other different functional departments, data sets from different data sources have different data partition forms. Different data sources store different sample information or different feature information, and effective preprocessing methods tailored to different data distributions, i.e., data set partition forms, will greatly impact the efficiency, accuracy, and security of the entire secure federated computation protocol. These different data source partition forms mainly manifest as horizontal partition, vertical partition, and hybrid partition, and can also be classified into two types based on data structure features: homogeneous partition or heterogeneous partition. Usually, in joint modeling scenarios that do not involve data source privacy and security, the data sets from multiple parties are integrated in a centralized manner with one node representing data from all parties, as shown in FIG. 2(A). This traditional centralized data source model, as the most common data partition manner, is commonly used in existing machine learning, deep neural networks, and data mining modeling processes that do not involve privacy and security issues. However, in the scenarios involved in the present disclosure, it is necessary to break the limitations of data silos and achieve joint modeling without disclosing data. Thus, the traditional centralized approach is no longer suitable. FIG. 2(B) shows a data source distribution model of a horizontal partition form, and this data partition form is also known as homogeneous partition, where different data sources hold data sets with the same feature space, differing only in the number of sample points. Therefore, in this partition manner, data sources are partitioned into n data sets with different numbers of sample points ($M_1 \sim M_n$), and these data sets are stored in n participant nodes. Similarly, FIG. 2(C) shows a data source distribution model of a vertical partition form, and this data partition form is also known as heterogeneous partition, where different data sources hold data sets with the same sample sequences, but the feature spaces corresponding to data sets of different parties are entirely different. In this partition manner, data sources are partitioned into n data sets with different features ($M_1 \sim M_n$), and these data sets are stored in n participant nodes. For more complex data distribution scenarios, where different parties hold data sets with inconsistent sample spaces and feature spaces, a mixed random partition form, as shown in FIG. 2(D), is required to store n data sets ($M_1 \sim M_n$) across n participant nodes distributively. This classification is a more general case of heterogeneous partition.

2) Multi-Source Heterogeneous Data Co-Reconstruction Model

In scenarios with distributed multi-source heterogeneous data sets, it is necessary to establish paradigms for secure multi-party federated computing models corresponding to different data partition forms. In other words, it is necessary to establish a multi-source heterogeneous data co-reconstruction model (MHDCM). Without loss of generality, a secure two-party regression federated computing problem is taken as an example, where an original data set is partitioned into two parts. M represents a sample space set of observed variables; Y represents a label space set of response variables; $M_1$ and $M_2$ are private sample matrix units, which are partitioned from the sample space set and stored in the computing node Alice and the computing node Bob, respectively; $Y_1$ and $Y_2$ are private label matrix units, which are partitioned from the label space set and stored in the computing node Alice and the computing node Bob, respectively.

Firstly, for joint modeling scenarios where exposure of multi-party data privacy is not taken into consideration, the traditional centralized data source aggregation method mentioned above can be directly applied. This approach stores the different multi-party heterogenous data sets, $M_1$, $M_2$, in the form of matrix [M] on a trusted server node of either Alice or Bob, and establishes a general centralized model analysis paradigm as shown in FIG. 3(A). Secondly, in joint scenarios that involve the privacy security of two-party homogeneous data sources, such as the form $$\begin{bmatrix} M_1 \\ M_2 \end{bmatrix} = \begin{bmatrix} M_1 \\ 0 \end{bmatrix} + \begin{bmatrix} 0 \\ M_2 \end{bmatrix},$$

the corresponding multi-source data, i.e., two different homogeneous data sets $M_1$, $M_2$, is stored separately in the participant nodes Alice and Bob in a horizontal partition manner. The analytical expression of the federated computing model is as shown in FIG. 3(B). Similarly, in joint scenarios that involve the privacy security of two-party heterogeneous data sources, such as the form $[M_1 \ M_2]=[M_1 \ 0]+[0 \ M_2]$, the corresponding multi-source data, i.e., two different heterogeneous data sets $M_1$, $M_2$, is stored separately in the two participant nodes in a vertical partition manner. The analytical expression of the federated computing model is as shown in FIG. 3(C). Furthermore, for more complex scenarios where multi-source heterogeneous data is distributed in a random mixed partition form, such as $M=M_1+M_2$, it is necessary to consider both horizontal partition of the sample space and vertical partition of the feature space. In this mixed partition form, two different heterogeneous data sets, $M_1$, $M_2$, are stored separately in two participant nodes, and the analytical expression of the federated computing model is as shown in FIG. 3(D). Clearly, the analytical expressions for two-party data sources in both horizontal and vertical partition scenarios can be generalized as the federated computing analytical expression under the mixed partition form shown in FIG. 3(D). Therefore, whether it is homogeneous or heterogeneous partition form, data subsets can be described using the multi-source heterogeneous analytical expression derived from the mixed partition form. This data representation will be uniformly adopted in the subsequent research on secure three-party linear regression protocol in the present disclosure.

The secure three-party linear regression protocol (3PLRP) is a process that enables three computation participants, Alice, Bob, and Carol, to jointly model multi-source heterogeneous data subsets under the premise that prediction label variables remain undisclosed. In comparison to traditional secure two-party linear regression, the secure three-party linear regression further enhances the protection for label data privacy and is suitable for complex scenarios where a higher level of security is required for joint modeling. Without loss of generality, an original data set $\{X \in R^{m \times n}; Y \in R^{m \times 1}\}$ with m sample points is considered. The data set is Dataset: $\{X; Y\}$ is partitioned into three heterogeneous data subsets using the random mixed partition form as described in FIGS. 2A-D, where two heterogeneous data matrices, $X_1 \in R^{m \times n}$ and $X_2 \in R^{m \times n}$ are stored in private databases of the node Alice and the node Bob, respectively. The data set partitioning in the sample space satisfies the following relationship: $X=X_1+X_2$. The private label matrix $Y \in R^{m \times 1}$ is separately assigned and stored in the private database of the participant node Carol. The key challenge in the secure three-party linear regression problem is to collaboratively establish an efficient and secure three-party linear regression model $X \cdot \beta = Y$ while ensuring that Alice, Bob, and Carol do not expose each other's computation data and to find an analytical expression for the regression coefficient matrix $\beta \in R^{n \times 1}$ of the model. The design process of this protocol consists of four core secure computation modules as follows:

1. Sample data obfuscation and multiplication module $f(X_1, X_2)=(X_1^T+X_2^T) \times (X_1+X_2)=\partial_1+\partial_2$. This module achieves first-stage random obfuscation encryption of original data information by obfuscating and multiplying private original matrix $X_1$, $X_2$ held by the participant node Alice and participant node Bob.
2. Sample data obfuscation and inversion module $f(\partial_1, \partial_2)=(\partial_1+\partial_2)^{-1}=u_1+u_2$. This module achieves second-stage random obfuscation encryption of the original data information by obfuscating and inverting the intermediate computation results $\partial_1$, $\partial_2$ of the first-stage encryption held by the participant node Alice and participant node Bob.
3. Sample data obfuscation and transposition module $f(X_1, X_2)=(X_1+X_2)^T=v_1+v_2$. This module achieves third-stage information encryption of the original data by obfuscating and transposing the private original matrix data $X_1$, $X_2$ held by the participant node Alice and participant node Bob.
4. Label data obfuscation and multiplication module $f((u_1, v_1), (u_2, v_2), Y)=(u_1+u_2) \cdot (v_1+v_2) \cdot Y=V_a'+V_b'+V_c$. This module achieves fourth-stage random obfuscation encryption of the original data information to obtain a final regression coefficient result by obfuscating and multiplying the intermediate computation results $u_1$, $u_2$ after the second-stage encryption, and the intermediate computation results $v_1$, $v_2$ after the third-stage encryption held by the participant node Alice and participant node Bob with the private original label data Y held by participant node Carol.

Figure 4:
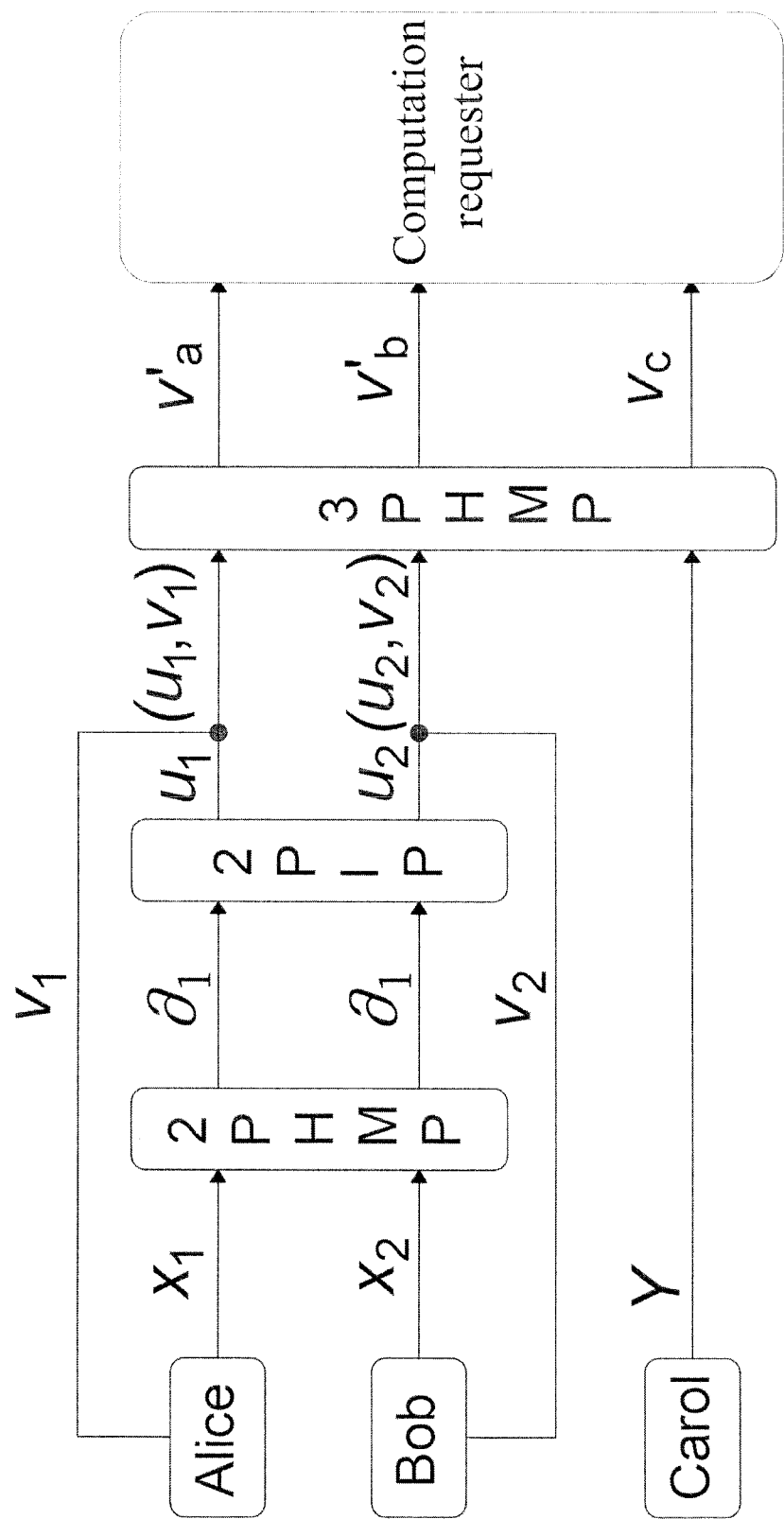
FIG. 4 is a flowchart diagram of a privacy-preserving computation method for secure three-party linear regression according to an embodiment of the present disclosure.

Since the four core secure computation modules mentioned above are built on basic secure two-party or three-party computation protocols, the final secure three-party regression model and the analytical expression $f(X, Y)=f(X_1, X_2, Y)=\beta=(X^T \cdot X)^{-1} \cdot X^T \cdot Y=[(X_1^T+X_2^T) \cdot (X_1+X_2)]^{-1} \cdot (X_1^T+X_2^T) \cdot Y$, $V_a'+V_b'+V_c$ for the regression coefficient matrix $\beta$ can be obtained by combining the previously proposed 2PMP, 3PMP, 2PHMP, 3PHMP, and 2PIP protocols, where, $V_a'+V_b'+V_c$ represent private regression coefficient matrix slices held by the node Alice, the node Bob, and the node Carol, respectively. For a more specific process of the secure three-party linear regression privacy protocol (3PLRP) is as shown in FIG. 4:

Step 1: The participant node Alice and the participant node Bob input their respective private matrices $X_1 \in R^{m \times n}$ and $X_2 \in R^{m \times n}$ based on the secure two-party matrix hybrid multiplication protocol 2PHMP, to collaboratively perform first-round secure computation in the sample data obfuscation and multiplication module. After execution of the 2PHMP protocol computation is completed, the intermediate computation result of this round will be randomly split into matrices $\partial_1$, $\partial_2 \in R^{n \times n}$ according to the random obfuscation technique, which are sent to the participant node Alice and the participant node Bob respectively. Based on the 2PHMP protocol, the two private output matrices satisfy the following relation: $\partial_1+\partial_2=(X_1^T+X_2^T) \cdot (X_1+X_2)$.

Step 2: The participant node Alice and the participant node Bob use the intermediate computation results $\partial_1$, $\partial_2$, which are encrypted based on random obfuscation, obtained after the first round of secure computation as input for second-round secure computation in the sample data obfuscation and inversion module, where the computation is performed based on the secure two-party matrix inversion protocol 2PIP, a computation result of this round is randomly split into matrices $u_1$, $u_2 \in R^{n \times n}$ based on the random obfuscation technique, which are then sent to the participant node Alice and the participant node Bob, and based on the 2PIP protocol, the two private output matrices satisfy the following relation: $u_1+u_2=(\partial_1+\partial_2)^{-1}$.

Step 3: The participant node Alice secretly splits a transposed result $X_1^T$ of the private matrix $X_1$ into a random matrix $v_1 \in R^{n \times m}$ and a difference matrix $\Delta \in R^{n \times m}$, where the matrix $X_1^T$ satisfies the following relation: $X_1^T=v_1+\Delta$; after the computation is finished, the node Alice sends the difference matrix $\Delta$ to the participant node Bob and stores, in a local database of the node Alice, $v_1$ as an encryption output result of third-round secure computation of the sample data obfuscation and transposition module.

Step 4: Upon receiving the difference matrix $\Delta$ from the node Alice, the participant node Bob first transposes the private matrix $X_2$ into a matrix $X_2$, and then secretly obfuscates and overlays the matrix $X_2$ with the difference matrix $\Delta$ to obtain a private matrix $v_2 \in R^{n \times m}$, where the private matrix satisfies the following relationship: $v_2=X_2^T+\Delta$, and the private matrix $v_2$ is stored in a local database of the node Bob as an encryption output result of third-round secure computation of the sample data obfuscation and transposition module.

Step 5: The participant node Alice, the participant node Bob, and the participant node Carol input their respective private matrix sequences $(u_1, v_1)$, $(u_2, v_2)$, Y based on the secure three-party matrix hybrid multiplication protocol 3PHMP, and collaboratively to execute fourth-round secure computation in the label data obfuscation and multiplication module. After execution of the 3PHMP protocol is completed, the computation result of this round will be randomly split into three random slice matrices $V_a'$, $V_b'$, $V_c \in R^{n \times 1}$ according to the random obfuscation technique, which are sent to the corresponding participant node Alice, participant node Bob, and participant node Carol respectively. Based on the 3PHMP protocol, the three regression coefficient matrices satisfy the following relation: $(u_1+u_2) \cdot (v_1+v_2) \cdot Y = u_1 v_1 Y + u_1 v_2 Y + u_2 v_1 Y + u_2 v_2 Y = V_a' + V_b' + V_c$.

Step 6: After the local computations in step 5 are completed, the participant node Alice, the participant node Bob, and the participant node Carol send their private regression coefficient matrices $V_a'$, $V_b'$, $V_c$ to a requester of secure three-party linear regression computation, where the requester aggregates the private regression coefficient matrices to obtain a final computation result $\beta = (X^T \cdot X)^{-1} \cdot X^T \cdot Y = V_a' + V_b' + V_c$. It is evident that:

$$V_a' + V_b' + V_c =$$
$$(W_{a0} + W_{c0}) + (W_{a1} + W_{b1} + W_{c1}) + (W_{a2} + W_{b2} + W_{c2}) + (W_{b3} + W_{c3}) =$$
$$u_1 v_1 Y + u_1 v_2 Y + u_2 v_1 Y + u_2 v_2 Y =$$
$$(u_1 + u_2) \cdot (v_1 + v_2) \cdot Y = (\partial_1 + \partial_2)^{-1} \times (X_1^T - \Delta + X_2^T + \Delta) \times Y =$$
$$\left[(X_1^T + X_2^T) \cdot (X_1 + X_2)\right]^{-1} \times (X_1^T + X_2^T) \times Y = (X^T \cdot X)^{-1} \cdot X^T \cdot Y.$$

Security Analysis

The secure three-party linear regression protocol is a process that enables three parties to achieve joint modeling under the assumption that all participant nodes are in a semi-honest model and data is not disclosed. According to the definition of security in the information theory, for a systematic algorithmic process, if the computation security of each sub-step corresponding to the protocol can be ensured, it is assumed that the entire protocol is process-level secure. If it can be ensured that the execution process for the final protocol result does not lead to the leakage of original data or intermediate results, it is assumed that the entire protocol is result-level secure. The security of this protocol in terms of process-level security and result-level security are separately explained below.

1) Process-Level Security

According to the definition of process-level security and the execution flow of 3PLRP provided in this embodiment, if the security of each step from step 1 to step 5 can be guaranteed, it can be declared that the protocol as a whole complies with process-level security. Specifically, for step 1, the participant node Alice and the participant node Bob strictly follow the computation process of secure two-party matrix hybrid multiplication protocol 2PHMP, while the 2PHMP protocol is composed of the secure two-party matrix multiplication protocol 2PMP, the security and reliability of which have been verified. Therefore, for the semi-honest participant nodes Alice and Bob, there is no risk of leaking their private data matrices when there is no collusion. Hence, the process-level security of step 1 can be guaranteed. For step 2, the participant node Alice and the participant node Bob strictly follow the computation process of the secure two-party matrix inversion protocol 2PIP, while the protocol 2PIP is also composed of the secure two-party matrix multiplication protocol 2PMP, the security and reliability of which have been verified. Therefore, for the semi-honest participant nodes Alice and Bob, there is no risk of leaking their private data matrices when there is no collusion. Hence, the process-level security of step 2 can be guaranteed. For step 3 and step 4, because the transposition and splitting are performed locally, without involving channel security or collusion issues, there is no risk of data leakage. Thus, for the participant node Alice and the participant node Bob, the process-level security of step 3 and step 4 can be strictly guaranteed. For step 5, the participant node Alice, the participant node Bob, and the participant node Carol strictly follow the computation process of the secure three-party matrix hybrid multiplication protocol 3PHMP, while the 3PHMP protocol is composed of the secure two-party matrix multiplication protocol 2PMP and the secure three-party matrix multiplication protocol 3PMP, the security and reliability of which have been verified. Therefore, for the semi-honest participant nodes Alice, Bob, and Carol, there is no risk of leaking their private data matrices when there is no collusion. Therefore, the process-level security of step 5 can be guaranteed. In summary, based on the definition of security in the information theory, since the process-level security of each of the foregoing steps can be ensured, the entire secure three-party linear regression protocol strictly complies with process-level security.

2) Result-Level Security

Therefore, for the final matrix sequences of regression coefficient results in the secure three-party linear regression joint modeling: $V_a'$, $V_b'$, $V_c$, whether before or after aggregation, the leakage of any slice matrix data will not result in the leakage of the original data or intermediate data of the three participants. This makes the protocol strictly comply with result-level security. At the same time, the protocol also complies with process-level security. Therefore, under the dual security protection, this protocol can be considered as meeting the security declaration of multi-party computation with semi-honest participant nodes under the information theory.

Figure 5:
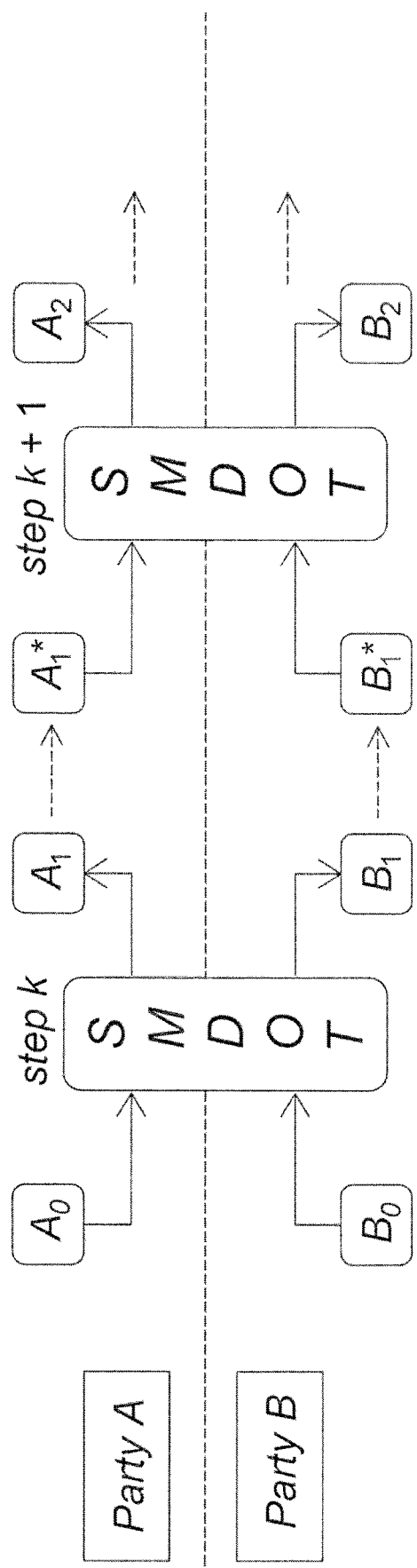
FIG. 5 is a schematic diagram of a data disguising technical solution according to an embodiment of the present disclosure.

Data disguising methodology is a means of data protection for safeguarding intermediate results in secure multi-party computations. It achieves one-time-one-secret protection by randomly splitting computation results into linear combinations. For most multi-party computations, the process of achieving secure computation typically involves more than one step. How to ensure safety of intermediate results is an inevitable problem. For example, when a two-party matrix product A×B is used as an intermediate result of the computation, whether the participant node Alice or Bod obtains a result of a final matrix A×B, it is possible to reversely deduce data information of the other party. Therefore, not only security of an original data input but also security of an intermediate value should be ensured during the privacy-preserving computation process. In order to solve this problem, the present disclosure proposes a data obfuscation encryption technique, in which an arbitrary multi-item operation is disassembled into a new multi-item addition method for obfuscating and computing a result of an intermediate value. To illustrate its principle more easily, a basic two-party operation type is exemplified in the embodiment of the present disclosure, and its principle is shown in FIG. 5. It is assumed that $S_k = F_k(A_i, B_i)$, where $F_k$ is a target computation function, $A_i$ is private data belonging to the organization Alice, and $B_i$ is private data belonging to the organization Bob. During execution of each step of the secure multi-party computation protocol, the intermediate result $S_k$ strictly follows the following constraint: Alice only knows its own computation result $A_k$, Bob only knows $B_k$, and $A_k+B_k=S_k$. The formula $[A_i:B_i] \to [A_k:B_k | A_k+B_k=F_k(A_i, B_i)]$ represents a transfer process of the intermediate value, during which Alice and Bob are not allowed to exchange each other's data information, including $A_k$ and $B_k$ split from the intermediate computation result. As long as it is ensured that the intermediate value is divided into two random data items at each step during the computation, it is possible to ensure that no one can reversely deduce an original data item from obfuscated and encrypted data, so that the whole process of privacy-preserving computation is highly secure.

Figure 6:
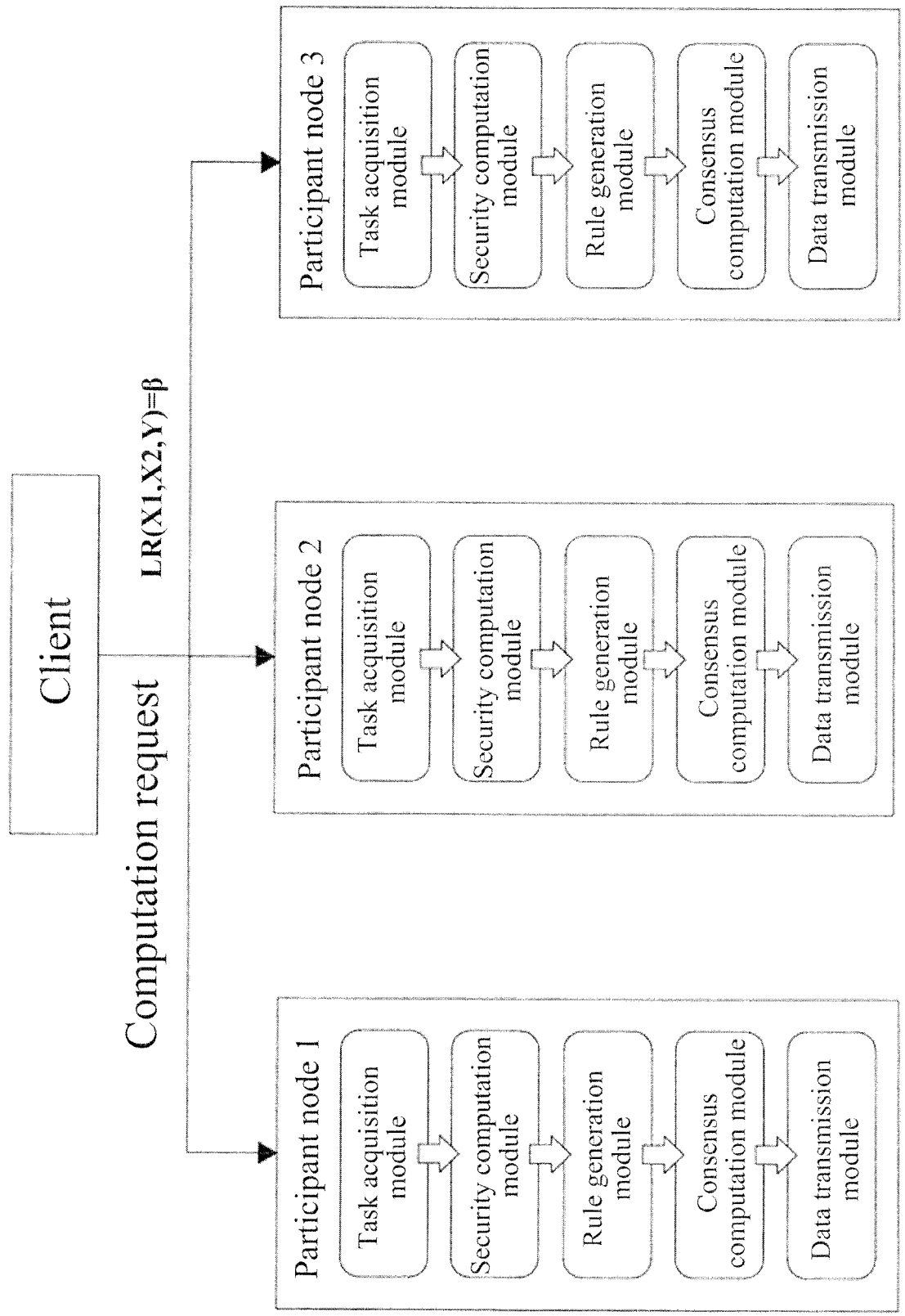
FIG. 6 is a diagram of an implementation apparatus of privacy-preserving computation for secure three-party matrix regression applied to a computing node according to an embodiment of the present disclosure.

To better illustrate the technical flow of the present disclosure, an embodiment of the present disclosure provides an apparatus for implementing the secure three-party linear regression model, as shown in FIG. 6. A process of implementation thereof is as follows:

Firstly, a corresponding distributed computing framework needs to be deployed at computation participant nodes participating in a secure three-party matrix regression task. The framework consists of five modules. The modules specifically include a task acquisition module, a secure computation module, a rule generation module, a consensus computation module, and a data transmission module. The task acquisition module is responsible for receiving and decoding a privacy-preserving computation request from a client. The secure computation module automatically matches a corresponding multi-party secure computation protocol according to a parsed computation request. The rule generation module splits a computation task according to an asynchronous instruction set of the secure computation protocol, and different computation nodes perform a collaborative computation according to respective self-rules. The consensus computation module, after receiving the assigned sub-rules, ensures synchronization of the computation and result consistency through a consensus agreement. After the computation is completed, the data transmission module collects computation results of the participant nodes and transmits the computation results to a computation requester.

A specific implementation is as follows: An external client sends, through an HTTP or GRPC communication protocol, a request for regression computation of original matrix matrices of three parties to a network terminal deployed with a distributed computation service. When a task acquisition module of a node on a network receives a request for the matrix regression computation, the task acquisition module parses the request and starts a secure computation service process of the corresponding computation participants: node 1, node 2, and node 3. After finishing parsing the corresponding computation request, the task acquisition module transmits the result to the secure computation module, which performs a joint query through an internal interface and synchronizes the result to the rule generation module in the three participant nodes after matching the corresponding secure computation protocol. The rule generation module makes different asynchronous parallel execution flows according to different subtasks undertaken by three different participant nodes, and maintains communication with the consensus computation module at each step of execution. The consensus computation module broadcasts and maintains consistency of results of distributed computation nodes on a chain and controls stability of an execution flow while the three participant nodes perform each computation instruction. After execution of the computation protocol is finished eventually and the three participant nodes obtain computation sub-results of each other, the three participant nodes send, by using the data transmission module, sub-matrices split from a two-party obfuscation result to the computation requester to obtain a correct computation result.

Corresponding to the foregoing method embodiment, an embodiment of the present disclosure provides a privacy-preserving computation system for secure three-party linear regression, including: a first private transposed matrix computing module, a second private transposed matrix computing module, a 2PHMP module, a 2PIP module, a splitting module, an obfuscation and overlay computation module, and a 3PHMP module.

The first private transposed matrix computing module is configured to allow a first participant to compute a transposed matrix of a first private matrix to obtain a first private transposed matrix, where the first private matrix is a private matrix of the first participant.

The second private transposed matrix computing module is configured to allow a second participant to compute a transposed matrix of a second private matrix to obtain a second private transposed matrix, where the second private matrix is a private matrix of the second participant.

The 2PHMP module configured to allow the first participant and the second participant to process the first private transposed matrix, the second private transposed matrix, the first private matrix, and the second private matrix by using a secure two-party matrix hybrid multiplication protocol, to obtain a matrix $\partial_1$ and a matrix $\partial_2$, where the matrix $\partial_1$ is stored in the first participant, and the matrix $\partial_2$ is stored in the second participant.

The 2PIP module is configured to allow the first participant and the second participant to process the matrix $\partial_1$ and the matrix $\partial_2$ by using a secure two-party matrix inversion protocol, to obtain a matrix $u_1$ and a matrix $u_2$, where the matrix $u_1$ is stored in the first participant, and the matrix $u_2$ is stored in the second participant.

The splitting module configured to allow the first participant to split the first private transposed matrix into a random matrix $v_1$ and a difference matrix $\Delta$, and send the difference matrix $\Delta$ to the second participant.

The obfuscation and overlay computation module is configured to allow the second participant to secretly obfuscate and overlay the second private transposed matrix with the difference matrix $\Delta$ to obtain a private matrix $v_2$.

The 3PHMP module is configured to allow a requester of secure three-party linear regression computation, the first participant, the second participant, and a third participant to process a first private matrix sequence, a second private matrix sequence, and a third private matrix by using a secure three-party matrix hybrid multiplication protocol, to obtain a regression coefficient matrix of a secure three-party linear regression model, where the third private matrix is a private matrix of the third participant, the first private matrix sequence includes the matrix $u_1$ and the random matrix $v_1$, and the second private matrix sequence includes the matrix $u_2$ and the random matrix $v_2$.

In practical application, the 2PHMP module specifically includes a first 2PMP unit, a matrix $V_{a0}$ computing unit, a second 2PMP unit, a matrix $V_{b0}$ computing unit, a matrix $\partial_1$ computing unit, and a matrix $\partial_2$ computing unit.

The first 2PMP unit is configured to allow the first participant and the second participant to process the first private transposed matrix and the second private matrix by using a secure two-party matrix multiplication protocol, to obtain a matrix $V_{a1}$ and a matrix $V_{b1}$. The matrix $V_{a1}$ is stored in the first participant, and the matrix $V_{b1}$ is stored in the second participant.

The matrix $V_{a0}$ computing unit is configured to allow the first participant to compute a product of the first private matrix and the first private transposed matrix, to obtain a matrix $V_{a0}$.

The second 2PMP unit is configured to allow the first participant and the second participant to process the first private matrix and the second private transposed matrix by using the secure two-party matrix multiplication protocol, to obtain a matrix $V_{a2}$ and a matrix $V_{b2}$. The matrix $V_{a2}$ is stored in the first participant, and the matrix $V_{b2}$ is stored in the second participant.

The matrix $V_{b0}$ computing unit is configured to allow the second participant to compute a product of the second private matrix and the second private transposed matrix, to obtain a matrix $V_{b0}$.

The matrix $\partial_1$ computing unit is configured to allow the first participant to obtain the matrix $\partial_1$ based on the matrix $V_{a1}$, the matrix $V_{a2}$, and the matrix $V_{a0}$.

The matrix $\partial_2$ computing unit is configured to allow the second participant to obtain the matrix $\partial_2$ based on the matrix $V_{b1}$, the matrix $V_{b2}$, and the matrix $V_{b0}$.

The present disclosure has the following technical effects:

1) The present disclosure proposes an end-to-end cascaded three-party federated regression scheme based on the secure two-party matrix hybrid multiplication protocol, secure two-party matrix inversion protocol, and secure three-party matrix hybrid multiplication protocol. Based on modular cascaded coupling, it achieves efficient joint regression modeling, addressing the issues of high client-side computational overhead and long communication time caused by the introduction of cryptographic techniques such as homomorphic encryption, circuit obfuscation, and secret sharing, as seen in the prior art. The present disclosure provides an efficient and secure three-party matrix regression solution in a semi-honest environment.

2) The present disclosure employs 2PMP and 3PMP, which support computations with float64-bit precision and offer result reliability verification, as the underlying support technologies for the entire solution. This approach resolves the problem in the prior art where the fixed-length ciphertext computation in the circuit obfuscation and homomorphic encryption schemes leads to a loss of numerical precision in floating-point computations. The present disclosure also avoids the issue of unreliable result precision due to noise encryption introduced by the differential privacy scheme. The present disclosure makes the applicability of secure matrix multiplication more versatile, with computation results having a numerical precision comparable to the centralized computation method.

3) Using a matrix transformation approach with random obfuscation, the present disclosure randomly splits the input and output of each stage of computation across different participant nodes. This allows for end-to-end distributed computing with dual protection for models and data throughout the entire process without relying on third-party cloud services. It addresses the security risk in the prior art where federated learning requires interaction of a significant amount of gradient parameters, potentially leading to model leakage. It also fills the technical gap of secure three-party regression protocols in scenarios where label information is not disclosed.

4) In view of complex heterogeneous data sources in multi-party joint modeling scenarios, the present disclosure establishes a standardized and unified analytical expression of multi-source heterogeneous data partitioning paradigm that covers three partitioning forms for data sets and label information: horizontal partitioning, vertical partitioning, and mixed partitioning. This further enables the quantification and standardization of the joint regression modeling method.

5) The present disclosure carries out model parsing based on the random mixed partitioning form of data sets in scenarios with distributed multi-source heterogeneous data sources, and designs a unified paradigm for quantified regression models covering three partitioning scenarios: horizontal partitioning, vertical partitioning, and mixed partitioning. This enhances the versatility of the solution for secure three-party linear regression problems.

Each embodiment in the description is described in a progressive mode, each embodiment focuses on differences from other embodiments, and references can be made to each other for the same and similar parts between embodiments. Since the system disclosed in an embodiment corresponds to the method disclosed in an embodiment, the description is relatively simple, and for related contents, references can be made to the description of the method.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. A privacy-preserving computation system for secure three-party linear regression, comprising:
a first private transposed matrix computing module configured to allow a first participant to compute a transposed matrix of a first private matrix to obtain a first private transposed matrix, wherein the first private matrix is a private matrix of the first participant;
a second private transposed matrix computing module configured to allow a second participant to compute a transposed matrix of a second private matrix to obtain a second private transposed matrix, wherein the second private matrix is a private matrix of the second participant;
a secure two-party matrix hybrid multiplication protocol (2PHMP) module configured to allow the first participant and the second participant to process the first private transposed matrix, the second private transposed matrix, the first private matrix, and the second private matrix by using a secure two-party matrix hybrid multiplication protocol, to obtain a matrix $\sigma_1$ and a matrix $\sigma_2$, wherein the matrix $\sigma_1$ is stored in the first participant, and the matrix $\sigma_2$ is stored in the second participant;
a secure two-party matrix inversion protocol (2PIP) module configured to allow the first participant and the second participant to process the matrix $\sigma_1$ and the matrix $\sigma_2$ by using a secure two-party matrix inversion protocol, to obtain a matrix $u_1$ and a matrix $u_2$, wherein the matrix $u_1$ is stored in the first participant, and the matrix $u_2$ is stored in the second participant;
a splitting module configured to allow the first participant to split the first private transposed matrix into a random matrix $v_1$ and a difference matrix $\Delta$, and send the difference matrix $\Delta$ to the second participant;

an obfuscation and overlay computation module configured to allow the second participant to secretly obfuscate and overlay the second private transposed matrix with the difference matrix $\Delta$ to obtain a random matrix $v_2$; and a secure three-party matrix hybrid multiplication protocol (3PHMP) module configured to allow a requester of secure three-party linear regression computation, the first participant, the second participant, and a third participant to process a first private matrix sequence, a second private matrix sequence, and a third private matrix by using a secure three-party matrix hybrid multiplication protocol, to obtain a regression coefficient matrix of a secure three-party linear regression model, wherein the third private matrix is a private matrix of the third participant, the first private matrix sequence comprises the matrix $u_1$ and the random matrix $v_1$, and the second private matrix sequence comprises the matrix $u_2$ and the random matrix $v_2$.

2. The privacy-preserving computation system for secure three-party linear regression according to claim 1, wherein the 2HMP module specifically comprises:

a first secure two-party matrix multiplication protocol (2PMP) unit configured to allow the first participant and the second participant to process the first private transposed matrix and the second private matrix by using a secure two-party matrix multiplication protocol, to obtain a matrix $V_{a1}$ and a matrix $V_{b1}$, wherein the matrix $V_{a1}$ is stored in the first participant, and the matrix $V_{b1}$ is stored in the second participant;

a matrix $V_{a0}$ computing unit configured to allow the first participant to compute a product of the first private matrix and the first private transposed matrix, to obtain a matrix $V_{a0}$;

a second 2PMP unit configured to allow the first participant and the second participant to process the first private matrix and the second private transposed matrix by using the secure two-party matrix multiplication protocol, to obtain a matrix $V_{a2}$ and a matrix $V_{b2}$, wherein the matrix $V_{a2}$ is stored in the first participant, and the matrix $V_{b2}$ is stored in the second participant;

a matrix $V_{b0}$ computing unit configured to allow the second participant to compute a product of the second private matrix and the second private transposed matrix, to obtain a matrix $V_{b0}$;

a matrix $\sigma_1$ computing unit configured to allow the first participant to obtain the matrix $\sigma_1$ based on the matrix $V_{a1}$, the matrix $V_{a2}$, and the matrix $V_{a0}$; and a matrix $\sigma_2$ computing unit configured to allow the second participant to obtain the matrix $\sigma_2$ based on the matrix $V_{b1}$, the matrix $V_{b2}$, and the matrix $V_{b0}$.

3. The privacy-preserving computation system for secure three-party linear regression according to claim 1, wherein the 2PIP module is further configured to:

randomly generate, by the first participant, a secret matrix P, and obtain a matrix $I_A$ based on the secret matrix P and the matrix $\sigma_1$;

randomly generate, by the second participant, a secret matrix Q, and obtain a matrix $I_B$ based on the matrix $\sigma_2$ and the secret matrix Q;

process, by the first participant and the second participant, the matrix $I_A$ and the secret matrix Q by using the secure two-party matrix multiplication protocol, to obtain a matrix $V_{a1}'$ and a matrix $V_{b1}'$, wherein the matrix $V_{a1}'$ is stored in the first participant, and the matrix $V_{b1}'$ is stored in the second participant;

process, by the first participant and the second participant, the secret matrix P and the matrix $I_B$ by using the secure two-party matrix multiplication protocol, to obtain a matrix $V_{a2}'$ and a matrix $V_{b2}''$, wherein the matrix $V_{a2}'$ is stored in the first participant, and the matrix $V_{a2}''$ is stored in the second participant;

obtain, by the first participant, the matrix $V_a$ based on the matrix $V_{a1}'$ and the matrix $V_{a2}'$, and send the matrix Va to the second participant;

obtain, by the second participant, a matrix $I_B^*$ based on the secret matrix Q, the matrix $V_a$, the matrix $V_{b1}'$, and the matrix $V_{b2}'$; and process, by the first participant and the second participant, the secret matrix P and the matrix $I_B^*$ by using the secure two-party matrix multiplication protocol, to obtain the matrix $u_1$ and the matrix $u_2$.

4. The privacy-preserving computation system for secure three-party linear regression according to claim 1, wherein the 2PIP module is further configured to:

randomly generate, by the first participant randomly, a reversible matrix P' and a reversible matrix Q', obtain, by the first participant and the second participant, a matrix $V_{a1}'''$ and a matrix $V_{b1}'''$ based on the reversible matrix P' and the matrix $\sigma_2$ by using the secure two-party matrix multiplication protocol, wherein the matrix $V_{a1}'''$ is stored in the first participant, and the matrix $V_{b1}'''$ is stored in the second participant;

obtain, by the first participant and the second participant, a matrix $V_{a2}'''$ and a matrix $V_{b2}'''$ based on the reversible matrix Q' and the matrix $V_{b1}'''$ by using the secure two-party matrix multiplication protocol, wherein the matrix $V_{a2}'''$ is stored in the first participant, and the matrix $V_{b2}'''$ is stored in the second participant;

obtain, by the first participant, a matrix $V_a''$ based on the matrix $V_{a1}'''$, matrix Q', matrix $V_{a2}'''$, matrix P', and matrix $\sigma_1$, and send the matrix $V_a''$ to the second participant;

obtain, by the second participant, a matrix T" based on the matrix $V_a''$ and the matrix $V_{b2}'''$, and compute an inverse matrix of the matrix T";

obtain, by the first participant and the second participant, a matrix $V_{a3}'$ and a matrix $V_{b3}'$ based on the matrix Q' and the inverse matrix of the matrix T" by using the secure two-party matrix multiplication protocol, wherein the matrix $V_{a3}'$ is stored in the first participant, and the matrix $V_{b3}'$ is stored in the second participant;

obtain, by the first participant and the second participant, a matrix $V_{a4}$ and a matrix $V_{b4}$ based on the matrix P' and the matrix $V_{b3}'$ by using the secure two-party matrix multiplication protocol;

compute, by the second participant, the matrix $u_2$ based on the matrix $V_{b4}$; and obtain, by the first participant, the matrix $u_1$ based on the matrix $V_{a3}'$, the matrix P', and the matrix $V_{a4}$.

5. The privacy-preserving computation system for secure three-party linear regression according to claim 1, wherein the 3PHMP module is further configured to:

compute, by the first participant, a matrix $A^*$ based on the first private matrix sequence, and compute, by the second participant, a matrix $B^*$ based on the second private matrix sequence;

obtain, by the first participant and the third participant, a matrix $V_{a0}'$ and a matrix $V_{c0}$ based on the matrix $A^*$ and the third private matrix by using the secure two-party matrix multiplication protocol, wherein the matrix $V_{a0}'$ is stored in the first participant, and the matrix $V_{c0}$ is stored in the third participant; obtain, by the second participant and the third participant, a matrix $V_{b3}$ and a matrix $V_{c3}$ based on the matrix B* and the third private matrix by using the secure two-party matrix multiplication protocol, wherein the matrix $V_{b3}$ is stored in the second participant, and the matrix $V_{c3}$ is stored in the third participant; obtain, by the first participant, the second participant, and the third participant, a matrix $V_{a1}''$, a matrix $V_{b1}''$, and a $V_{c1}$ based on the matrix $u_1$, the random matrix $v_2$, and the third private matrix by using a secure three-party matrix multiplication protocol, wherein the matrix $V_{a1}''$ is stored in the first participant, the matrix $V_{b1}''$ is stored in the second participant, and the matrix $V_{c1}$ is stored in the third participant; obtain, by the second participant, the first participant, and the third participant, a matrix $V_{a2}''$, a matrix $V_{b2}''$, and a matrix $V_{c2}$ based on the matrix $u_2$, the random matrix $v_1$, and the third private matrix by using the secure three-party matrix multiplication protocol, wherein the matrix $V_{a2}''$ is stored in the first participant, the matrix $V_{b2}''$ is stored in the second participant, and the matrix $V_{c2}$ is stored in the third participant;

obtain, by the first participant, a matrix $V_a'$ based on the matrix $V_{a0}'$, the matrix $V_{a1}''$, and the matrix $V_{a2}''$ and send the matrix $V_a'$ to the requester of the secure three-party linear regression computation;

obtain, by the second participant, a matrix $V_b'$ based on the matrix $V_{b1}''$, the matrix $V_{b2}''$, and the matrix $V_{b3}$ and send the matrix $V_b'$ to the requester of the secure three-party linear regression computation;

obtain, by the third participant, a matrix $V_c$ based on the matrix $V_{c0}$, the matrix $V_{c1}$, the matrix $V_{c2}$, and the matrix $V_{c3}$ and send the matrix $V_c$ to the requester of the secure three-party linear regression computation; and obtain, by the requester of the secure three-party linear regression computation, the regression coefficient matrix of the secure three-party linear regression model based on the matrix $V_a'$, the matrix $V_b'$, and the matrix $V_c$.

6. The privacy-preserving computation system for secure three-party linear regression according to claim 2, wherein the first 2PMP unit is further configured to:

generate, by an auxiliary computing node, two random matrix pairs $(R_a, r_a)$ and $(R_b, r_b)$, and send the random matrix pair $(R_a, r_a)$ to the first participant and the random matrix pair $(R_b, r_b)$) to the second participant;

obtain, by the first participant, a matrix $\hat{A}$ based on the matrix $R_a$ and the first private transposed matrix, and send the matrix $\hat{A}$ to the second participant;

obtain, by the second participant, a matrix $\hat{B}$ based on the matrix $R_b$ and the second private matrix, and send the matrix $\hat{B}$ to the first participant;

randomly generate, by the second participant, a matrix $V_{b1}$, generate a matrix T based on the matrix $\hat{A}$, the second private matrix $r_b$, the matrix $r_{b1}$, and the matrix Vet, and send the matrix T to the first participant; and obtain, by the first participant, the matrix $V_{a1}$ based on the matrix T, the matrix $r_a$, the matrix $R_a$, and the matrix $\hat{B}$.

7. The privacy-preserving computation system for secure three-party linear regression according to claim 3, wherein the 2PIP module is further configured to:

obtain, by the second participant, a matrix Va based on the matrix $V_{b1}'$ and the matrix $V_{b2}'$;

obtain a matrix T' based on the matrix $V_b$ and the matrix $V_a$; and obtain the matrix $I_B^*$ based on an inverse matrix of the matrix T' and the secret matrix Q.

8. The privacy-preserving computation system for secure three-party linear regression according to claim 5, wherein the 3PHMP module is further configured to:

randomly generate, by an auxiliary computing node, three random matrix pairs $(R_a', r_a)$, $(R_b', r_b')$, and $(R_c, r_c)$, and send the random matrix pair $(R_a', r_a')$ to the first participant, the random matrix pair $(R_b', r_b')$ to the second participant, and the random matrix pair $(R_c, r_c)$ to the third participant;

obtain, by the first participant, a matrix $\hat{A}'$ based on the matrix $R_a'$ and the matrix $u_1$ and send the matrix $\hat{A}$ to the second participant;

obtain, by the third participant, a matrix $\hat{C}$ based on the matrix $R_c$ and the third private matrix and send the matrix $\hat{C}$ to the second participant;

obtain, by the second participant, a matrix $\hat{B}'$ based on the matrix $R_b'$ and the random matrix $v_2$ and determine whether the matrix $\hat{B}'$ is full rank, to obtain a first determining result;

if the first determining result is no, randomly generate, by the auxiliary computing node, three random matrix pairs $(R_a', r_a')$, $(R_b', r_b')$, and $(R_c, r_c)$, and send the random matrix pair $(R_a', r_a')$ to the first participant, the random matrix pair $(R_b', r_b')$ to the second participant, and the random matrix pair $(R_c, r_c)$ to the third participant;

if the first determining result is yes, obtain, by the second participant, a matrix $M_b$ based on the matrix $\hat{A}'$, the matrix $R_b'$, and the matrix $\hat{C}$, compute a matrix $\varphi$ based on the matrix $\hat{A}$ and the matrix $\hat{B}$, obtain a matrix $\gamma_1$ based on the matrix $\hat{A}'$ and the matrix $R_b'$, compute a matrix $\varphi_2$ based on the matrix $\hat{B}'$ and the matrix $\hat{C}$, and compute a matrix $\gamma_2$ based on the matrix Rp' and the matrix $\hat{C}$, wherein the matrix $\varphi_1$ and the matrix $\gamma_1$ are sent to the third participant, while the matrix $\varphi_2$ and the matrix $\gamma_2$ are sent to the first participant;

compute, by the first participant, a matrix $S_a$ based on the matrix $R_a'$ and the matrix $\gamma_2$, and compute a matrix $M_a$ based on the matrix $u_1$ and the matrix $\varphi_2$;

compute, by the third participant, a matrix $S_c$ based on the matrix $\gamma_1$ and the matrix $R_c$, and compute a matrix $M_c$ based on the matrix $\varphi_1$ and the matrix $R_c$;

perform, by the second participant, a full-rank decomposition on the matrix $\hat{B}'$ to obtain a column full-rank matrix and a row full-rank matrix, and send the column full-rank matrix to the first participant, and the row full-rank matrix to the third participant;

randomly generate, by the first participant, the matrix $V_{a1}''$, obtain a matrix $T_a$ based on the matrix $M_a$, the matrix $S_a$, the matrix $V_{a1}''$, and the matrix $r_a$, obtain a matrix $t_1$ based on the matrix $R_a'$ and the column full-rank matrix, and send the matrix $T_a$ and the matrix $t_1$ to the second participant;

obtain, by the third participant, a matrix $t_2$ based on the row full-rank matrix and the matrix $R_c$, and send the matrix $t_2$ to the second participant;

randomly generate, by the second participant, the matrix $V_{b1}''$, obtain a matrix $S_b$ based on the matrix $t_1$ and the matrix $t_2$, obtain a matrix $T_b$ based on the matrix $T_a$, the matrix $M_b$, the matrix $S_b$, the matrix $V_{b1}''$, and the matrix $r_b$, and send the matrix $T_b$ to the third participant; and obtain, by the third participant, the matrix $V_{c1}$ based on the matrix $T_b$, the matrix $M_c$, the matrix $S_c$, and the matrix $r_c$.

\* \* \* \* \*